United States Patent
Landrum et al.

(10) Patent No.: US 7,789,748 B2
(45) Date of Patent: Sep. 7, 2010

(54) GAMING DEVICE HAVING PLAYER-SELECTABLE MUSIC

(75) Inventors: Kristopher E. Landrum, South Lake Tahoe, CA (US); Darren Maya, Reno, NV (US); Marc S. Mierau, Reno, NV (US)

(73) Assignee: IGT, Reno, NV (US)

( * ) Notice: Subject to any disclaimer, the term of this patent is extended or adjusted under 35 U.S.C. 154(b) by 513 days.

(21) Appl. No.: 10/655,416

(22) Filed: Sep. 4, 2003

(65) Prior Publication Data

US 2005/0054441 A1 Mar. 10, 2005

(51) Int. Cl.
*A63F 9/24* (2006.01)

(52) U.S. Cl. .............................. 463/20; 463/35; 463/16

(58) Field of Classification Search .................... 463/35, 463/20; 434/307 A; 84/610
See application file for complete search history.

(56) References Cited

U.S. PATENT DOCUMENTS

| | | |
|---|---|---|
| 3,831,172 A | 8/1974 | Olliges et al. |
| 4,300,225 A | 11/1981 | Lambl |
| 4,314,236 A | 2/1982 | Mayer et al. |
| 4,339,798 A | 7/1982 | Hedges et al. |
| 4,344,345 A | 8/1982 | Sano |
| 4,363,482 A | 12/1982 | Goldfarb |
| RE31,441 E | 11/1983 | Nutting et al. |
| 4,496,149 A | 1/1985 | Schwartzberg |
| 4,582,324 A | 4/1986 | Koza et al. |
| 4,618,150 A | 10/1986 | Kimura |
| 4,624,459 A | 11/1986 | Kaufman |
| 4,660,107 A | 4/1987 | Chippendale, Jr. |
| 4,695,053 A | 9/1987 | Vazquez, Jr. et al. |
| 4,712,189 A | 12/1987 | Mohri |
| 4,732,386 A | 3/1988 | Rayfiel |
| 4,733,593 A | 3/1988 | Rothbart |
| 4,791,558 A | 12/1988 | Chaitin et al. |
| 4,876,937 A | 10/1989 | Suzuki |
| 4,961,575 A | 10/1990 | Perry |

(Continued)

FOREIGN PATENT DOCUMENTS

EP 0 945 837 A2 9/1999

(Continued)

OTHER PUBLICATIONS

Article, "A Salute to Game Shows-The Price Is Right-Pricing Games-Three Strikes," p. 8 of 9, online, retrieved on Aug. 16, 2000. Retrieved from the Internet: <http://ben-schumin.simplenet.com/game-shows/shows/price-is-right/pricing-games-4.htm>.

(Continued)

*Primary Examiner*—John M Hotaling, II
(74) *Attorney, Agent, or Firm*—K&L Gates LLP

(57) ABSTRACT

A gaming device and a method for operating the gaming device including enabling a player to select music to be played during a game. The music selections include music recordings within general music classifications such as genre and style and music recordings within specific classifications such as artist or group, album or song. The game presents the music classification selections for player selection at any point before, during or after the game. In one embodiment, the music recordings within the music classification selected by the player and played by the gaming device are incorporated into the theme of the game.

38 Claims, 15 Drawing Sheets

U.S. PATENT DOCUMENTS

| | | |
|---|---|---|
| 4,974,483 A | 12/1990 | Luzzatto |
| 4,974,857 A | 12/1990 | Beall et al. |
| 5,046,735 A | 9/1991 | Hamano et al. |
| 5,096,195 A | 3/1992 | Gimmon |
| 5,119,465 A | 6/1992 | Jack |
| 5,179,517 A | 1/1993 | Sarbin et al. |
| 5,221,801 A | 6/1993 | Bruti et al. |
| 5,223,828 A | 6/1993 | McKiel, Jr. |
| 5,242,163 A | 9/1993 | Fulton |
| 5,258,574 A | 11/1993 | Kawano |
| 5,266,736 A | 11/1993 | Saito |
| 5,275,400 A | 1/1994 | Weingardt et al. |
| 5,287,102 A | 2/1994 | McKiel, Jr. |
| 5,331,112 A | 7/1994 | Sato et al. |
| 5,342,047 A | 8/1994 | Heidel et al. |
| 5,371,345 A | 12/1994 | LeStrange et al. |
| 5,390,938 A | 2/1995 | Takeya |
| 5,393,061 A | 2/1995 | Manship et al. |
| 5,393,070 A | 2/1995 | Best |
| 5,429,507 A | 7/1995 | Kaplan |
| 5,429,513 A | 7/1995 | Diaz-Plaza |
| 5,430,835 A | 7/1995 | Williams et al. |
| 5,446,902 A | 8/1995 | Islam |
| 5,449,173 A | 9/1995 | Thomas et al. |
| 5,469,511 A | 11/1995 | Lewis et al. |
| 5,470,233 A | 11/1995 | Fruchterman et al. |
| 5,472,197 A | 12/1995 | Gwiasda et al. |
| 5,508,699 A | 4/1996 | Silverman |
| 5,515,764 A | 5/1996 | Rosen |
| 5,577,253 A | 11/1996 | Blickstein |
| 5,606,144 A | 2/1997 | Dabby |
| 5,611,535 A | 3/1997 | Tiberio |
| 5,625,845 A | 4/1997 | Allran |
| 5,630,754 A | 5/1997 | Rebane |
| 5,655,961 A | 8/1997 | Acres et al. |
| 5,668,996 A | 9/1997 | Radinsky |
| 5,695,188 A | 12/1997 | Ishibashi |
| 5,697,843 A | 12/1997 | Manship et al. |
| 5,702,304 A | 12/1997 | Acres et al. |
| 5,703,310 A | 12/1997 | Kurakake et al. |
| 5,707,286 A | 1/1998 | Carlson |
| 5,715,459 A | 2/1998 | Celi |
| 5,741,183 A | 4/1998 | Acres et al. |
| 5,745,761 A | 4/1998 | Celi |
| 5,745,762 A | 4/1998 | Celi |
| 5,752,882 A | 5/1998 | Acres et al. |
| 5,758,875 A | 6/1998 | Giacalone, Jr. |
| 5,762,552 A | 6/1998 | Vuong et al. |
| 5,766,074 A | 6/1998 | Cannon et al. |
| 5,769,716 A | 6/1998 | Saffari et al. |
| 5,772,509 A | 6/1998 | Weiss |
| 5,778,231 A | 7/1998 | Van Hoff |
| 5,792,972 A | 8/1998 | Houston |
| 5,802,364 A | 9/1998 | Senator |
| 5,807,172 A | 9/1998 | Piechowiak |
| 5,809,303 A | 9/1998 | Senator |
| 5,812,688 A | 9/1998 | Gibson |
| 5,820,459 A | 10/1998 | Acres et al. |
| 5,823,873 A | 10/1998 | Moody |
| 5,833,538 A | 11/1998 | Weiss |
| 5,836,817 A | 11/1998 | Acres et al. |
| 5,839,958 A | 11/1998 | Ozarow |
| 5,848,932 A | 12/1998 | Adams |
| 5,854,927 A | 12/1998 | Gelissen |
| 5,876,284 A | 3/1999 | Acres et al. |
| 5,880,386 A | 3/1999 | Wachi et al. |
| 5,889,990 A | 3/1999 | Coleman |
| 5,892,171 A | 4/1999 | Ide |
| 5,902,184 A | 5/1999 | Bennett et al. |
| 5,908,354 A | 6/1999 | Okuniewicz |
| 5,910,048 A | 6/1999 | Feinberg |
| 5,911,071 A | 6/1999 | Jordan |
| 5,920,720 A | 7/1999 | Toutonghi |
| 5,920,842 A | 7/1999 | Cooper et al. |
| 5,923,878 A | 7/1999 | Marsland |
| 5,923,880 A | 7/1999 | Rose |
| 5,930,509 A | 7/1999 | Yates |
| 5,937,193 A | 8/1999 | Evoy |
| 5,946,487 A | 8/1999 | Dangelo |
| 5,946,489 A | 8/1999 | Yellin |
| 5,951,397 A | 9/1999 | Dickinson |
| 5,964,846 A | 10/1999 | Berry |
| 5,966,535 A | 10/1999 | Benedikt |
| 5,967,894 A | 10/1999 | Kinoshita et al. |
| 5,970,249 A | 10/1999 | Holzle |
| 5,978,585 A | 11/1999 | Crelier |
| 5,980,384 A | 11/1999 | Barrie |
| 5,997,401 A | 12/1999 | Crawford |
| 5,999,731 A | 12/1999 | Yellin |
| 6,003,038 A | 12/1999 | Chen |
| 6,015,346 A | 1/2000 | Bennett |
| D421,277 S | 2/2000 | McGahn et al. |
| 6,021,272 A | 2/2000 | Cahill |
| 6,021,273 A | 2/2000 | Griesemer |
| 6,026,238 A | 2/2000 | Bond |
| 6,027,115 A | 2/2000 | Griswold et al. |
| 6,029,000 A | 2/2000 | Woolsey |
| 6,031,993 A | 2/2000 | Andrews |
| 6,035,120 A | 3/2000 | Ravichandran |
| 6,052,527 A | 4/2000 | Delcourt et al. |
| 6,056,642 A | 5/2000 | Bennett |
| 6,062,979 A | 5/2000 | Inoue |
| 6,066,181 A | 5/2000 | DeMaster |
| 6,071,192 A | 6/2000 | Weiss |
| 6,074,432 A | 6/2000 | Guccione |
| 6,075,940 A | 6/2000 | Gosling |
| 6,079,985 A | 6/2000 | Wohl et al. |
| 6,084,169 A | 7/2000 | Hasegawa et al. |
| 6,089,976 A | 7/2000 | Schneider et al. |
| 6,089,978 A | 7/2000 | Adams |
| 6,092,147 A | 7/2000 | Levy |
| 6,096,095 A | 8/2000 | Halstead |
| 6,102,400 A | 8/2000 | Scott et al. |
| 6,103,964 A | 8/2000 | Kay |
| 6,106,393 A | 8/2000 | Sunaga et al. |
| 6,110,041 A | 8/2000 | Walker et al. |
| 6,110,043 A | 8/2000 | Olsen |
| 6,110,226 A | 8/2000 | Bothner |
| 6,113,495 A | 9/2000 | Walker |
| 6,117,009 A | 9/2000 | Yoseloff |
| 6,126,165 A | 10/2000 | Sakamoto |
| 6,131,191 A | 10/2000 | Cierniak |
| 6,138,273 A | 10/2000 | Sturges |
| 6,141,794 A | 10/2000 | Dice |
| 6,142,875 A | 11/2000 | Kodachi et al. |
| 6,146,273 A | 11/2000 | Olsen |
| 6,146,276 A | 11/2000 | Okuniewicz |
| 6,155,925 A | 12/2000 | Giobbi et al. |
| 6,159,096 A | 12/2000 | Yoseloff |
| 6,159,097 A | 12/2000 | Gura |
| 6,162,122 A | 12/2000 | Acres et al. |
| 6,174,233 B1 | 1/2001 | Sunaga et al. |
| 6,174,235 B1 | 1/2001 | Walker et al. |
| 6,175,632 B1 | 1/2001 | Marx |
| 6,186,894 B1 | 2/2001 | Mayeroff |
| 6,198,395 B1 | 3/2001 | Sussman |
| 6,217,448 B1 | 4/2001 | Olsen |
| 6,224,482 B1 | 5/2001 | Bennett |
| 6,227,971 B1 | 5/2001 | Weiss |
| 6,233,731 B1 | 5/2001 | Bond et al. |
| 6,238,288 B1 | 5/2001 | Walker et al. |
| 6,241,612 B1 | 6/2001 | Heredia |
| 6,254,481 B1 | 7/2001 | Jaffe |
| 6,257,981 B1 | 7/2001 | Acres et al. |

| | | | |
|---|---|---|---|
| 6,270,411 B1 | 8/2001 | Gura et al. | |
| 6,290,600 B1 | 9/2001 | Glasson | |
| 6,293,869 B1 | 9/2001 | Kwan et al. | |
| 6,295,638 B1 | 9/2001 | Brown et al. | |
| 6,302,790 B1 | 10/2001 | Brossard | |
| 6,306,034 B1 | 10/2001 | Sakamoto et al. | |
| 6,309,299 B1 | 10/2001 | Weiss | |
| 6,309,301 B1 | 10/2001 | Sano | |
| 6,311,982 B1 | 11/2001 | Lebensfeld et al. | |
| 6,319,125 B1 | 11/2001 | Acres | |
| 6,321,323 B1 | 11/2001 | Nugroho et al. | |
| 6,328,648 B1 | 12/2001 | Walker et al. | |
| 6,364,768 B1 | 4/2002 | Acres et al. | |
| 6,375,567 B1 | 4/2002 | Acres | |
| 6,375,568 B1 | 4/2002 | Roffman et al. | |
| 6,375,569 B1 | 4/2002 | Acres | |
| 6,390,923 B1 | 5/2002 | Yoshitomi et al. | |
| 6,409,596 B1 | 6/2002 | Hayashida et al. | |
| 6,416,411 B1 | 7/2002 | Tsukahara | |
| RE37,885 E | 10/2002 | Acres et al. | |
| 6,491,584 B2 | 12/2002 | Graham et al. | |
| 6,504,089 B1* | 1/2003 | Negishi et al. | 84/609 |
| 6,516,466 B1 | 2/2003 | Jackson | |
| 6,533,658 B1 | 3/2003 | Walker et al. | |
| 6,537,152 B2 | 3/2003 | Seelig et al. | |
| 6,544,122 B2 | 4/2003 | Araki et al. | |
| 6,554,703 B1 | 4/2003 | Bussick et al. | |
| 6,561,908 B1 | 5/2003 | Hoke | |
| 6,565,434 B1 | 5/2003 | Acres | |
| 6,565,436 B1 | 5/2003 | Baerlocher | |
| 6,599,195 B1 | 7/2003 | Araki et al. | |
| 6,638,169 B2 | 10/2003 | Wilder et al. | |
| 6,656,046 B1 | 12/2003 | Yoseloff et al. | |
| 6,682,073 B2 | 1/2004 | Bryant et al. | |
| 6,755,738 B2 | 6/2004 | Glasson et al. | |
| 6,769,985 B1 | 8/2004 | Laakso et al. | |
| 6,810,517 B2 | 10/2004 | Bond et al. | |
| 6,835,132 B2 | 12/2004 | Bennett | |
| 6,848,996 B2 | 2/2005 | Hecht et al. | |
| 6,939,226 B1* | 9/2005 | Joshi | 463/20 |
| 6,942,574 B1 | 9/2005 | LeMay | |
| 7,355,112 B2 | 4/2008 | Laakso | |
| 2001/0029542 A1 | 10/2001 | Nishimura | |
| 2002/0039919 A1 | 4/2002 | Joshi et al. | |
| 2002/0077165 A1 | 6/2002 | Bansemer et al. | |
| 2002/0090990 A1 | 7/2002 | Joshi et al. | |
| 2002/0109718 A1 | 8/2002 | Mansour et al. | |
| 2003/0064798 A1 | 4/2003 | Grauzer et al. | |
| 2003/0064801 A1 | 4/2003 | Breckner et al. | |
| 2003/0064808 A1 | 4/2003 | Hecht et al. | |
| 2003/0073489 A1 | 4/2003 | Hecht et al. | |
| 2003/0073490 A1 | 4/2003 | Hecht et al. | |
| 2003/0073491 A1 | 4/2003 | Hecht et al. | |
| 2003/0078103 A1 | 4/2003 | LeMay et al. | |
| 2004/0048657 A1 | 3/2004 | Gauselmann | |
| 2004/0053695 A1 | 3/2004 | Mattice et al. | |
| 2004/0063489 A1 | 4/2004 | Crumby | |
| 2004/0142739 A1 | 7/2004 | Loose et al. | |
| 2004/0142747 A1* | 7/2004 | Pryzby | 463/35 |
| 2004/0209685 A1 | 10/2004 | Lucchesi et al. | |
| 2005/0043090 A1 | 2/2005 | Pryzby et al. | |
| 2005/0054440 A1 | 3/2005 | Anderson et al. | |
| 2005/0054442 A1 | 3/2005 | Anderson et al. | |
| 2005/0064935 A1 | 3/2005 | Blanco | |
| 2005/0159218 A1 | 7/2005 | Blanco | |
| 2005/0277469 A1 | 12/2005 | Pryzby et al. | |
| 2005/2028263 | 12/2005 | Bonney et al. | |
| 2006/0073881 A1 | 4/2006 | Pryzby et al. | |

FOREIGN PATENT DOCUMENTS

| | | |
|---|---|---|
| EP | 0 978 809 A2 | 2/2000 |
| EP | 0993847 A1 | 4/2000 |
| EP | 0 997 856 A2 | 5/2000 |
| EP | 0 997 857 A2 | 5/2000 |
| EP | 1000642 A2 | 5/2000 |
| EP | 1 079 345 A1 | 2/2001 |
| EP | 1 225 565 A2 | 7/2002 |
| EP | 1 439 507 A3 | 3/2005 |
| GB | 2 201 279 A | 8/1988 |
| JP | 11197292 A | 12/1997 |
| JP | 411216221 A | 8/1999 |
| JP | 2000107466 A | 4/2000 |
| JP | 02000296209 A | 10/2000 |
| JP | 2001062029 A | 3/2001 |
| JP | 2003290422 A | 10/2003 |
| WO | WO 97/32285 | 9/1997 |
| WO | WO0217295 A1 | 2/2002 |
| WO | WO 2004/014501 A2 | 2/2004 |
| WO | WO 2005113089 | 12/2005 |
| WO | WO 2005113091 | 12/2005 |
| WO | WO 2005114598 | 12/2005 |
| WO | WO 2005117647 | 12/2005 |
| WO | WO 2005120127 | 12/2005 |
| WO | WO2006017036 A1 | 2/2006 |
| WO | WO2006017445 A2 | 2/2006 |

OTHER PUBLICATIONS

Article, "Frankie & Annette's Beach Party Bally Gaming," published by Strictly Slots, Dec. 2001.

Article, "Megaman X's Soundcard History Museum," pp. 1-5, retrieved on May 11, 2000 on Internet at http://digitalparadise.cgocable.ca/MegaMan_X/Soundcards.

Article, "Microprocessor Report," pp. 2, 12-17, published by Micro Design Resources on Mar. 25, 1996.

Article, "Monopoly Movers & Shakers Williams/WMS Gaming," published by Strictly Slots publication in Jul. 2000.

Brochure of Bally Gaming, Inc., "EVO Hybrid Frankie & Annette's Beach Party," published by Bally Gaming, Inc. in the year 2001 on or before December thereof.

Brochure of Bally Gaming, Inc., "Frankie & Annette's Beach Party (EVO Hybrid)," http://www.ballygaming.com/gameroom/games.asp?gameID=664, Jan. 9, 2004.

Brochure of IGT, "Elephant King," http://www.igt.com/games/new_games/elephant.html, Mar. 21, 2001.

Brochure of IGT, "Leopard Spots, Double Diamond 2000, Little Green Men, Elephant King, I Dream of Jeannie," available in Oct. 1999.

Brochure of IGT, "Run for Your Money S-Plus Limited," published in the year 1998 on or before December thereof.

Brochure of IGT, "Top Dollar S-Plus Limited," published in the year 1998 on or before December thereof.

Brochure of IGT, "Totem Pole," written by IGT, available in the year 1997, on or before December thereof.

Brochure of IGT, "Wheel of Fortune," published in the year 1998 on or before December thereof.

Brochure of WMS Gaming Inc., "Meet the Next Generation of Monopoly Slot Machines from WMS Gaming!" published by Hasbro, Inc. in the year 1999 on or before December thereof.

Brochure of WMS Gaming Inc., "Monopoly Chairman of the Board," published by Hasbro, Inc. in the year 1999 on or before December thereof.

Brochure of WMS Gaming Inc., "Monopoly Once Around," published by Hasbro, Inc. in the year 1998 on or before December thereof.

Brochure of WMS Gaming Inc., "Monopoly Reel Estate," published by Hasbro, Inc. in the year 1998 on or before December thereof.

Brochure of WMS Gaming Inc., "Movers & Shakers," published by Hasbro, Inc. in the year 2000 on or before December thereof.

Chutes and Ladders CD-ROM Game, Hasbro Interactive, Inc., available in the year 1999 on or before December thereof.

Description of Accelerated Credit Roll-Up in Gaming Machines written by IGT, available in the year 1999 on or before December thereof.

Description of Action Prompts in Gaming Machines, written by IGT, available in the year 1999 on or before December thereof.
Description of Last Sound in Credit Roll-Up in Gaming Machines written by IGT, available in the year 2000 on or before December thereof.
Description of Lighting Features in Gaming Machines, written by IGT, available in the year 1999 on or before December thereof.
Description of Maximum Wager Sound and Bet Sounds in Gaming Devices written by IGT, available in the year 2000 on or before December thereof.
Description of Payout Sound Feature in Gaming Machine written by IGT, available in the year 1999 on or before December thereof.
Description of Progressive Sound Feature in Pinball and Video Games written by IGT, available in the year 1999 on or before December thereof.
Description of Sound Effects in Gaming Devices written by IGT, available in the year 2000 on or before December thereof.
Description of Sound Feature in Totem Pole™ Gaming Machine written by IGT, available in the year 1997 on or before December thereof.
Description of Tempo Change in Gaming Machines written by IGT, available in the year 2000 on or before December thereof.
Description of Verbal Wager Feature in "Dick Clark" Gaming Machine written by IGT, available in the year 2000 on or before December thereof.
Description of Volume Control Functions in Gaming Machines written by IGT, available in the year 1999 on or before December thereof.
MIDI Media Adaptation Layer for IEEE-1394, published by the Association of Musical Electronics Industry in Tokyo, Japan and The MIDI Manufacturers Association in Los Angeles, California, Nov. 30, 2000, pp. 1-17.
Press Release by Ian Fried of CNET News.com, "Microsoft Releases XP for Slot Machines," file://C:WINDOW... \Microsoft releases XP for slot machines—Tech News—CNET.com.htm., Nov. 28, 2001, pp. 1-2.
Press Release, "WMS Gaming's Monopoly Slot Machines Named 1998's Most Innovative Gaming Product At The American Gaming, Lodging and Leisure Summit," published by WMS Gaming Inc. on Jan. 13, 1999.
Screen Shot and Description by IGT of "Free Spins Bonus (Elephant King)" written by IGT, available in Oct. 1999.
Screen Shots of "Race Car Bonus Feature" written by IGT, available in the year 1998 on or before December thereof.
The Java™ Tutorial, "What Can Java Technology Do?" http://java.sun.com/docs/books/tutorial/getStarted/i.../definition.htm, Oct. 16, 2000, pp. 1-2.
The MIDI File Format, http://crystal.capana.org.au/ghansper/midi_introduction/midi_file_format.html, Dec. 28, 2001, pp. 1-10.
Banana-Rama Brochure, published by Silicon Gaming, available prior to Dec. 2000.
Break the Spell Brochure, published by Atronics in 1999, on or before December thereof.
Cash Chameleon Brochure, written by Aristocrat, published in Oct. 2000.
Cliff Hanger Advertisement web page http://www.geocities.com/Hollywood/Set/9859/tpir/tpir10.html printed on Mar. 21, 2001.
Cliff Hangers article web page http://members.aol.com/schmoliktpir/hangers.html, printed on Mar. 21, 2001.
Cliff Hangers Bonus and Plinko Bonus Advertisement published prior to Sep. 9, 2003.
Definition of Pitch, Merriam-Webster's Collegiate Dictionary, Tenth Edition, p. 886, 1999, on or before December thereof.
Jazzy Jackpots Advertisements written by Atronic, published in 2000, on or before December thereof.
Jazzy Jackpots Article written by Strictly Slots, published in Mar. 2001.
Slots 2003, written by Melissa Raimondi, published in Jan. 2003.
The Price is Right Featuring Plinko Advertisement written by IGT, published in 2001, on or before December thereof.
The Price is Right Plinko written by IGT, published in Dec. 2001.

* cited by examiner

GAMING DEVICE HAVING PLAYER-SELECTABLE MUSIC

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which enables a player to select music or sound recordings to be played in conjunction with the gaming device.

BACKGROUND OF THE INVENTION

Modern gaming machines provide an entertaining experience for players using visual and audio displays. Sound plays an important role in entertaining the players. In fact, the majority of modern gaming machines with wagering games such as slot machines include computer systems which are equipped with audio components operable to generate sounds, such as music or sound effects at various times during the primary or base games, secondary or bonus games, attract modes and other modes. Gaming machines typically initiate the play of sound recordings when certain game events occur, such as a player winning a value or reaching a bonus round.

To increase player enjoyment and excitement, it is desirable to provide players with new gaming machines which have new and entertaining sound functions.

SUMMARY OF THE INVENTION

The present invention relates to a gaming device having player-selectable sound recordings such as music performances. The gaming device, in one embodiment, enables the player to select the music to be played by the gaming device during one or more plays of the primary or secondary games. In one embodiment, each of the musical selections are coordinated with the theme and game play of the gaming machine.

In one embodiment, the selections presented to the player include music categorized, organized, or classified by any suitable characteristic such as genre, style, artist, title, album, period, instrumentation, theme, etc. The selections, in one embodiment, include the categorization or classification of the music by genre such as rock, country, jazz, classical, new age, world, folk, bluegrass, rap, reggae, blues, vocal, gospel and easy listening. It should be appreciated that the selections may include suitable styles within a particular genre of music such as alternative, pop, and dance styles of the rock music genre or, alternatively, any suitable category or level or type of music classification. In an alternative embodiment, the gaming machine enables the player to select the instruments or types of instruments that are used to play the selections. In one such embodiment, the same musical composition and/or song is played by different instruments which are selectable by the player.

In one embodiment, the gaming device stores a relatively small number of musical classifications for selection by the player. The game implementer will have the music in each of the musical classifications set up to coordinate with the events of the primary and/or secondary game.

In a further alternative embodiment, the gaming device enables the player to proceed through a series of selections to narrow the selection of music to more specific predetermined sub-categories or classifications. For example, if the player desires to listen to only music by the fusion jazz musician, David Sanborn, the gaming device, in one embodiment, enables the player to select "Jazz" from a plurality of selections including musical genres. The gaming device, thereafter, enables the player to select "Fusion" from a plurality of selections including styles of jazz. Finally, the gaming device enables the player to select the music of "David Sanborn" from a plurality of selections including jazz artists to be played during the game. It should be appreciated that the gaming device could have originally presented the player with selections including particular artists among other artists or musicians. Alternatively, the gaming device, in one embodiment, associates a combination of different classification levels or categories with the selections presented to the player.

In one embodiment, any suitable predetermined event functions as a music-selection triggering event in a primary or secondary game such as the occurrence of a single symbol or a combination of symbols, on a set of reels, the initiation of a primary or secondary game, a player gaining value or losing value, the initiation of a bonus round, the ending of a primary or secondary game, a player input, or the initiation of any predetermined game mode or state. In another embodiment, the gaming device provides a plurality of musical selections to the player when the player is provided an award in the game. Alternatively, the gaming device provides the plurality of musical selections to the player upon reaching predetermined levels of play in the game such as a bonus game. In one alternative embodiment, the gaming device presents the music selections to the player randomly throughout the game or, alternatively, at predetermined points during, or at the beginning of, the base or bonus game.

In one embodiment, each type of music-selection event is associated with certain game event data or player input data stored in a suitable data storage device. The processor operates with a sound card to read and use this data to present the player with music selections at the appropriate time. In one embodiment, the data storage device, which is accessed by the processor, includes game read only memory (ROM) and game random access memory (RAM). The game ROM includes game code and music code. The game code includes instructions executable to control the gaming device so that it plays one or more particular games in accordance with applicable game rules and pay tables. The music code includes a set of instructions executable by the processor uses to determine the type, duration, and other music variables of the sound recordings to be played in response to the player selection or input.

The random access memory (RAM) music code defines an association of: (a) predetermined events (game events or input events) to various classifications of music selections; and (b) predetermined player input events to various sound recordings. The music selection RAM, included within the game RAM, includes game event data and player input data. The game event data is generated by the processor when a music-selection event occurs before, during or after a game.

For example, in one embodiment of a slot game, the reels include at least one music symbol wherein the generation of at least one music symbol or a combination of symbols including a music symbol causes the gaming device to provide a plurality of musical selections to the player. The processor accesses the game event data associating the predetermined event of a symbol combination with various classifications of music selections. The gaming device subsequently enables the player, in one embodiment, to pick one of the music selections by touching the symbol representing one of the three different types of music displayed by a display device including a touch screen. Based on the player's selection, the processor receives and uses the player input data to cause a particular song or series of songs to be played.

In one embodiment, the gaming device provides a plurality of musical selections to the player when a player makes a predetermined input. The player can make an input in the gaming device by using any suitable player input device. A player input device may include any suitable mechanical, electromechanical, electric or electronic device or component, sensor or system which enables the player to input one or more signals to the gaming device, including, without limitation, buttons, dials, wheels, touch screens, mouses, joysticks, track balls and voice sensors or other activators. In addition, the processor accesses the player input data to associate the input with various classifications of music.

In one embodiment, the gaming device associates music selections provided to the player with themes of the game wherein the music selection picked by the player determines the theme of the game. For example, if the player picks country as the type of music to be played during the game or portion of the game or a plurality of games, the gaming device, in one embodiment, adopts a western theme. Other gaming themes can be matched with the music styles presented to the player for selection as desired by the game implementer. Similarly, in an alternative embodiment, the musical selection picked by the player determines the game presented to the player. In one embodiment, the gaming device associates a plurality of musical selections provided to the player with a plurality of games. In response to the player input, the gaming device, in both embodiments, incorporates the music into the theme of the game.

Alternatively, the gaming device adapts the music classification selected by the player to the theme or level of intensity of the game. Upon picking the music selection, the gaming device adapts the thematic music of the game to the music genre selected by the player. Adapting the music classification, in one embodiment, includes altering any musical variable or suitable changeable factor which affects the sound or quality of a sound recording such as musical key, musical tempo, musical style, musical melody, musical jump to a different section of a song or composition, musical beat, upbeat changes, downbeat changes, musical keys, musical notes, musical chords, musical sample rate, musical pitch, musical crescendo singing voice (e.g., a change from the voice of one singer to the voice of a different singer), syncopation, mode, scale or instrument. The type of music selected by the player continues to play and to be adapted, if necessary, throughout the game, until the gaming device presents the player with another plurality of selections.

When the processor changes from playing one music recording to another, the processor can stop the first music recording at one point in time and start the second music recording at the same point in time in a seamless manner to the player. The processor can also fade-out the first music recording and the simultaneously play or fade-in the second music recording. Alternatively, the processor can play a transitional music recording to produce a musical transition from the first sound recording to the second music recording. Furthermore, when the processor makes a change from playing an initial music recording to another music recording, the change can be timed so that the transition is not on-beat, or the change can be timed so that the second music recording is generated on-beat with the initial music recording.

It is therefore an advantage of the present invention to provide a gaming device which enables a player to select the music or music variables to be played in the game or at different events in the game.

Other objects, features and advantages of the invention will be apparent from the following detailed disclosure, taken in conjunction with the accompanying sheets of drawings, wherein like numerals refer to like parts, elements, components, steps, and processes.

DETAILED DESCRIPTION OF THE INVENTION

Gaming Device and Electronics

Figure 1A:
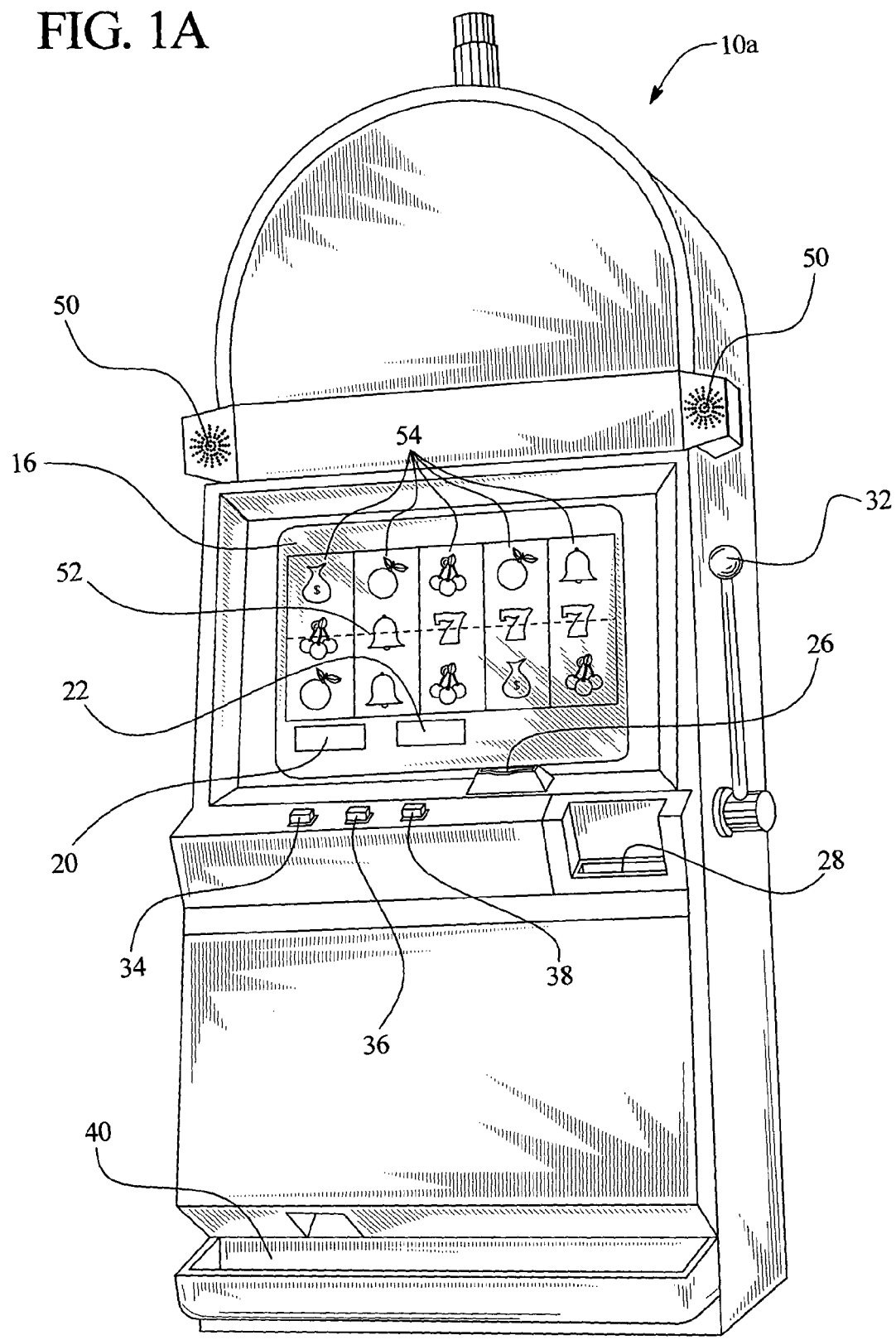
FIG. 1A is a front perspective view of one embodiment of the gaming device of the present invention.
Figure 1B:
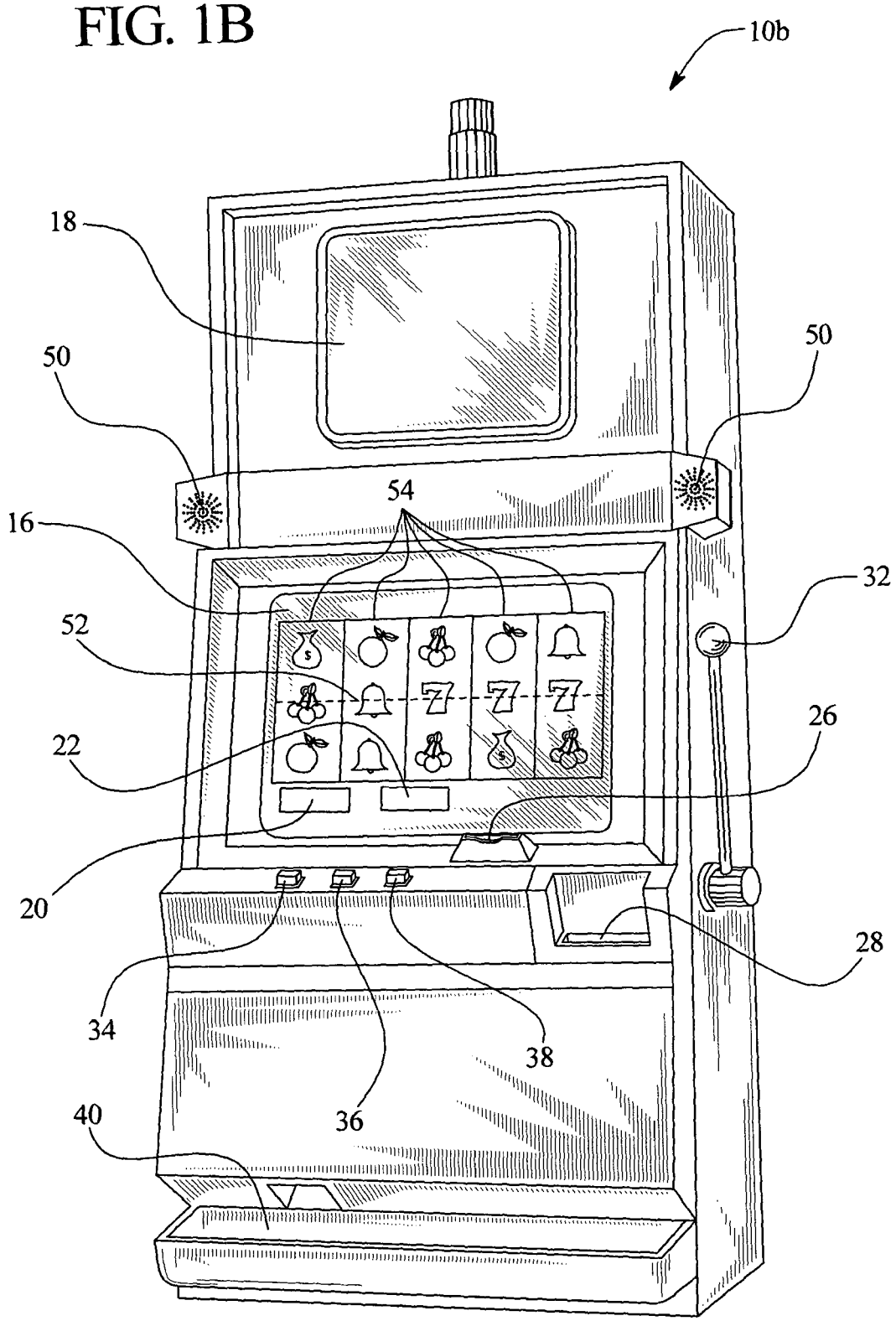
FIG. 1B is a front perspective view of another embodiment of the gaming device of the present invention.

Referring now to the drawings, two alternative embodiments of the gaming device of the present invention are illustrated in FIGS. 1A and 1B as gaming device 10a and gaming device 10b, respectively. Gaming device 10a and/or gaming device 10b are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

The gaming device of the present invention includes a suitable sound system embodied in one or more computer systems used to operate the gaming device. The sound system includes a particular configuration of sound-specific memory which can be incorporated into any suitable computer system of a gaming device, including, but not limited to, systems which operate in gaming devices locally and systems which remotely operate one or more gaming devices through one or more networks.

Figure 2A:
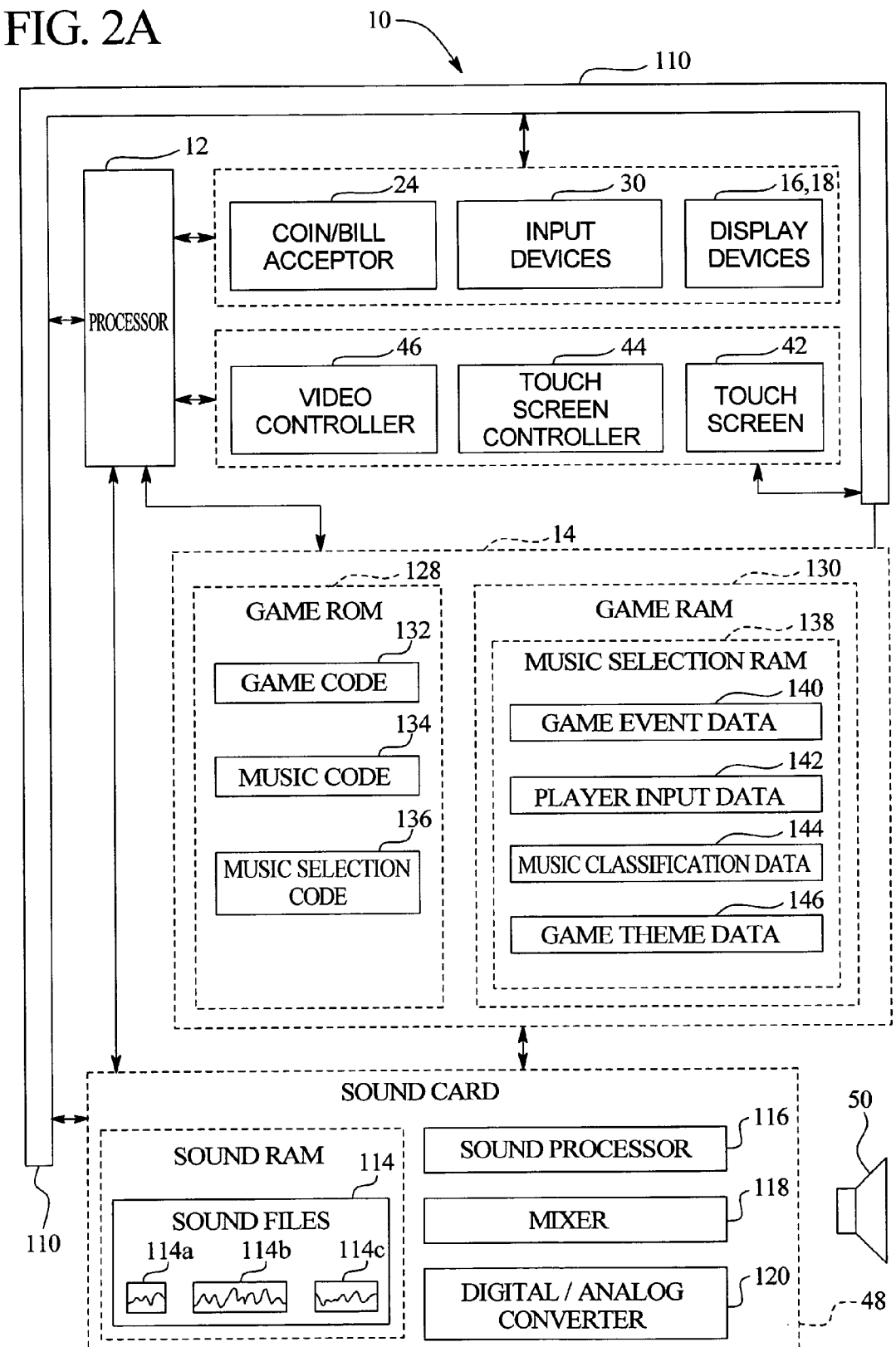
FIG. 2A is a schematic block diagram of the electronic configuration of one embodiment of the gaming device of the present invention.

With reference to FIG. 2A, in one embodiment, the sound system of gaming device 10 includes: at least one central processing unit or processor 12 such as a microprocessor, a microcontroller-based platform, a suitable integrated circuit or one or more application-specific integrated circuits (ASIC's); a memory device or data storage device 14 for storing program code or other data; a sound card 48 and one or more speakers or other suitable sound producing devices 50. This embodiment may also include payment acceptor 26 such as a coin slot or bill acceptor; central display device 16; an upper display device 18; and one or more input devices 30. All of these components electronically communicate with one another through a bus 110.

The processor 12 is in communication with, or operable to access or to exchange signals with, at least one data storage or memory device 14. In one embodiment, the processor and the memory device reside within the cabinet of the gaming device. The memory device stores program code and instructions, executable by the processor, to control the gaming device. The memory device also stores other data such as sound and music data in addition to image data, event data, player input data, random or pseudo-random number generators, pay-table data or information and applicable game rules that relate to the play of the gaming device.

In one embodiment, part, or all, of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

The data storage device 14, communicating with processor 12, includes game read only memory (ROM) 128 and game random access memory (RAM) 130 which, at times, communicate with one another. In one embodiment, the memory device includes flash memory and/or EEPROM (electrically erasable programmable read only memory). Any other suitable magnetic, optical and/or semiconductor memory may be implemented in conjunction with the gaming device of the present invention.

Game ROM 128 includes game code 132, music code 134 and music selection code 136. Game code 132 includes instructions which control the gaming device 10 so that it plays one or more particular games in accordance with applicable game rules and pay tables. The music code 134 includes a set of instructions which the processor 12 uses to determine the type, duration, and volume of sound recordings to be played. In one embodiment, the music code 134 is a commercially available code such as music instrument digital interface (MIDI).

Music selection code 136 includes instructions which direct the processor 12 how to generate, store, interpret and use the data stored in music selection random access memory (RAM) 138. Specifically, music selection code 136 includes instructions which direct the processor 12 to: (a) display a plurality of selections including a plurality of associated music classifications when a predetermined game event or input event occurs; (b) play a music recording associated with the music classification selected by the player; and (c) stop the play of the music recording. The particular music recordings which processor 12 plays may be predetermined based on the music classification selected by the player.

The instructions of music selection code 136, in one embodiment, also relate or associate game events or input events with music recordings, and the instructions further associate each music recording with one or more music classifications 144.

Music selection RAM 138, included within the game RAM 130, includes game event data 140, player input data 142, music classification data 144, and, in one embodiment, game theme data 146. Music selection RAM 138 temporarily stores all of this data such as in the form of buffer memory. It should be appreciated that the present invention can be adapted so that the music selection RAM 138 can include other types of data which relate to the characteristics or quality of one or more music recordings.

In another alternative embodiment of the present invention, the gaming device does not include music selection code, but instead includes a database or data tables which store game event data, music recording data, game themes data and player input event data, all in relational relationship with one another. In this embodiment, the data is organized so that: (a) different types of game events or input events are associated with different music recordings; (b) the music recordings are each associated with one or more game themes; and (c) different types of player inputs are associated with different music recordings.

In one embodiment, as seen in FIG. 2A, the gaming device includes a sound generating device controlled by one or more sound cards 48 which function in conjunction with the processor. The sound card 48 includes sound random access memory (RAM) 112 which includes a plurality of sound files 114, identified as 114A, 114B and 114C. Sound files 114 can include any type of sound file readable by the processor 12. In one embodiment, sound files 114 include digital wave files for musical sound recordings and sound effect recordings.

In one embodiment, the sound-generating device includes at least one, and preferably a plurality of, speakers 50 or other sound-generating hardware and/or software for generating sounds, such as playing music for the primary and/or secondary game or for other modes of the gaming device, such as an attract mode. The sound card 48, in one embodiment, includes a sound processor 116 which drives a mixer 118 and an analog-to-digital converter 120, thereby, causing speakers 50 to generate sound. Mixer 118 enables the sound processor 116 to vary the volume of the sound recordings.

In one embodiment, the gaming device provides dynamic sounds coupled with attractive multimedia images displayed on one or more of the display devices to provide an audio-visual presentation or to otherwise display full-motion video with sound to attract players to the gaming device. During idle periods, the gaming device may display a sequence of audio and/or visual attraction messages to attract potential players to the gaming device. The videos may also be customized to provide any appropriate information.

When the processor changes from playing one sound recording to another, the processor can stop the first sound recording at one point in time and start the second sound recording at the same point in time (e.g., simultaneously). The processor can also fade-out the first sound recording and play or fade-in the second sound recording. Alternatively, the processor can play a transitional sound recording to produce a musical transition from the first sound recording to the second sound recording.

In addition, when the processor makes a change from playing an initial sound recording to an alternative of that sound recording, the change can be timed so that the transition is not on-beat, or the change be timed so that the alternative sound recording is generated on-beat with the initial sound recording. In the latter case, the gaming device, in one embodiment, can include a suitable software metronome or metronome program which the processor uses to make music selections on-beat or as otherwise described in U.S. Pat. No. 6,561,908.

In one embodiment, as illustrated in FIG. 2A, the gaming device includes one or more display devices controlled by the processor. The display devices are connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, or elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on the display device may be in mechanical form. That is, the display device may include any electromechanical device, such as one or more mechanical objects, such as one or more rotatable wheels, reels or dice, configured to display at least one, and preferably a plurality of, game or other suitable images, symbols or indicia.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

As illustrated in FIG. 2A, in one embodiment, the gaming device includes at least one payment acceptor 24 in communication with the processor. As seen in FIGS. 1A and 1B, the payment acceptor 24 may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 26. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen 42 and the touch-screen controller 44 are connected to a video controller 46 and processor 12. A player can make decisions and input signals into the gaming device by touching the touch-screen 42 at the appropriate places.

As illustrated in FIG. 2A, the gaming device enables the player to use the player input devices 30, such as a touch screen 42 to input music selection signals into the gaming device 10. It should be appreciated that the gaming device may provide a plurality of musical selections to the player for any predetermined input through any suitable player input device. In one embodiment, a player input device to select music includes any mechanical, electromechanical, electric or electronic device or component, sensor or system which enables the player to provide one or more signals to the gaming device, including, without limitation, buttons, dials, wheels, touch screens, mouses, joysticks, track balls, voice sensors and other suitable input devices to receive music selection signals. When a player generates an input signal with a player input device, a player input event occurs. When the processor 12 reads the player input events, processor 12 causes certain music selections to be generated, as described below.

In one embodiment, each type of music selection event is associated with certain game event data 140 or player input data 142. Event data 140 and input data 142 preferably include flag data. The flag data flags or directs the processor 12 to start a sound recording or make a particular music selection. The game event data 140 is data generated by the processor 12 when a music selection event occurs in a game. Any predetermined event can be a music selection event. In one embodiment, a music selection event occurs when the game starts, a player gains value or loses value, a bonus round is triggered or when the game ends. Music selection events can also occur when the player makes a selection, activates an input device 30 or other activator or makes an advancement or progress in a game or for any other reason.

In one alternative embodiment of the present invention, the gaming device does not include game event data for the purpose of triggering the selection of sound files. Rather, a player causes the processor to present music selections by a predetermined player input such as a "Select Music" button. In this embodiment, certain player input events are associated with groups of sound files and other player input events are associated with alternative groups of sound files. In operation of one example, a player may cause the gaming device to present a set of music selections to be selected by depositing currency in the gaming device. The player may then cause the gaming device to present the same or an alternative set of music selections to be selected by later pushing a bet one button.

The player input data 142 is the data which processor 12 generates when the player makes a predetermined input. The processor 12 reads the data in game RAM 130, and, using game ROM 128, the processor 12 plays certain sounds and causes certain music selections to occur. The gaming device, for example, presents one set of music selections to the player for a primary game, and the gaming device presents another set of music selections to the player for a bonus round game. The primary game set of selections are associated with a set of game themes, and the bonus game set of selections are associated with another set of game themes.

The gaming device may further include a plurality of communication ports for enabling communication of the processor with external peripherals, such as external video sources, expansion buses, game or other displays, an SCSI port or a key pad.

It should be appreciated that although a processor 12 and data storage device 14 are preferable implementations of the present invention, the present invention can also be implemented using one or more application-specific integrated circuits (ASIC's) or other hard-wired devices, or using mechanical devices. Furthermore, although the processor 12 and data storage device 14 preferably reside on each gaming device unit, it is possible to provide some or all of their functions at a central location such as a network server for communication to a playing station such as over a local area network (LAN), wide area network (WAN), Internet connection, microwave link, and the like as discussed below.

Figure 2B:
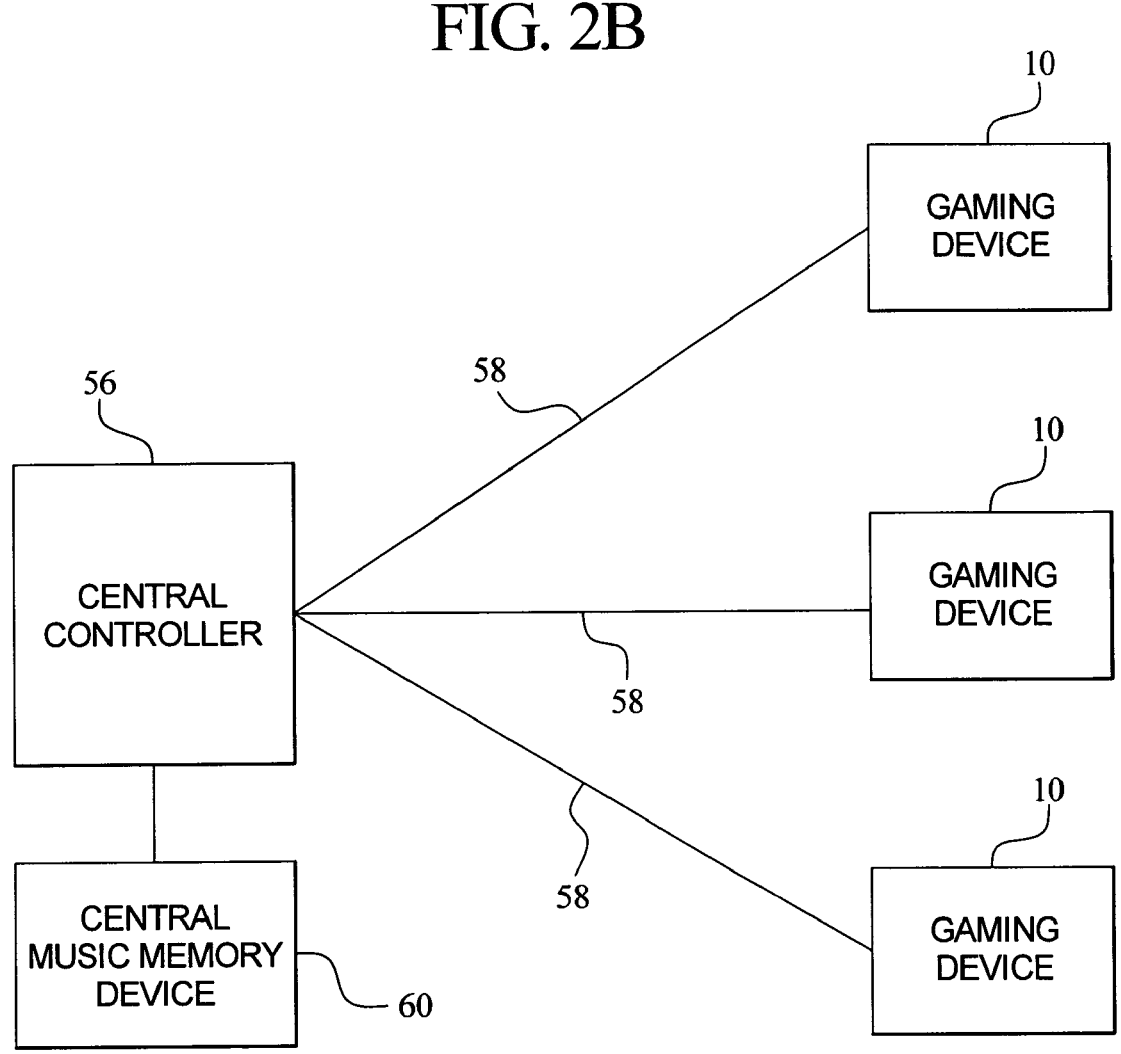
FIG. 2B is a schematic block diagram of a central determination embodiment of the gaming device of the present invention.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 62. The paylines 62 may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; the player must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Player-Selectable Music Selections

Figure 3:
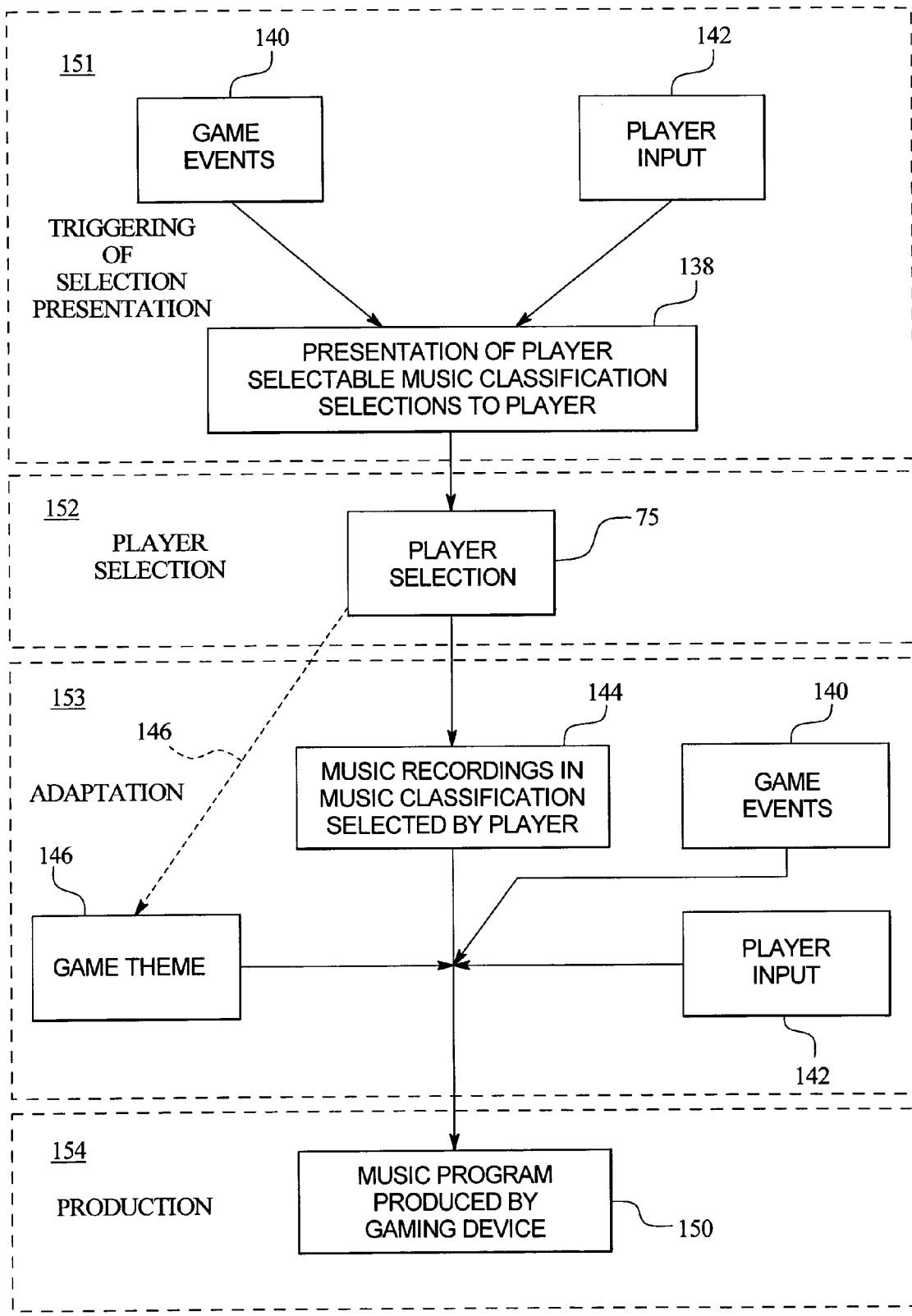
FIG. 3 is a schematic block diagram illustrating a process of generating sound recordings such as music in one of the embodiments of the present invention.

Referring now to FIG. 3, in one embodiment of the present invention, the gaming device initiates a music selection mode of a base or bonus game. In the music selection mode, the gaming device associates a plurality of classifications of music with a plurality of music selections and enables the player to pick one of the music selections. The gaming device subsequently plays or performs music recordings from the music classification associated with the selection picked by the player. The player-selectable sound system of the gaming device of the present invention adds another dimension of entertainment and enjoyment experienced by gaming device players.

FIG. 3 illustrates a general scheme of one embodiment of music production by the gaming device. The four main steps of generating music in one embodiment of the present invention includes triggering the presentation of music classification selections as illustrated in block 151, selecting the music classification or the music recordings based on the player selection as illustrated in block 152, adapting the music recordings as illustrated in block 153, and producing the music as illustrated in block 154.

Player inputs illustrated by block 142 and events during the game illustrated by block 140, including the initiation of the game or any portion of the game, trigger the presentation of the player-selectable music classification selections to the player as illustrated in block 138. Based on the player selection of a particular music classification which includes categories of music recordings based on their characteristics, such as the genre, style, instrumentation, period, album, artist or group, etc., the gaming device accesses and selects a plurality of music recordings associated with the selected classification as illustrated in block 144. The musical recordings selected by the gaming device are, in one embodiment, adapted by events in the game 140, by player input 142 or by the theme(s) of the game 146. In an alternative embodiment, the player selection determines the theme or the game to be played 148. Once the music recording is adapted, if necessary, the gaming device produces or plays the music recording or series of recordings as illustrated in block 150.

Figure 4A:
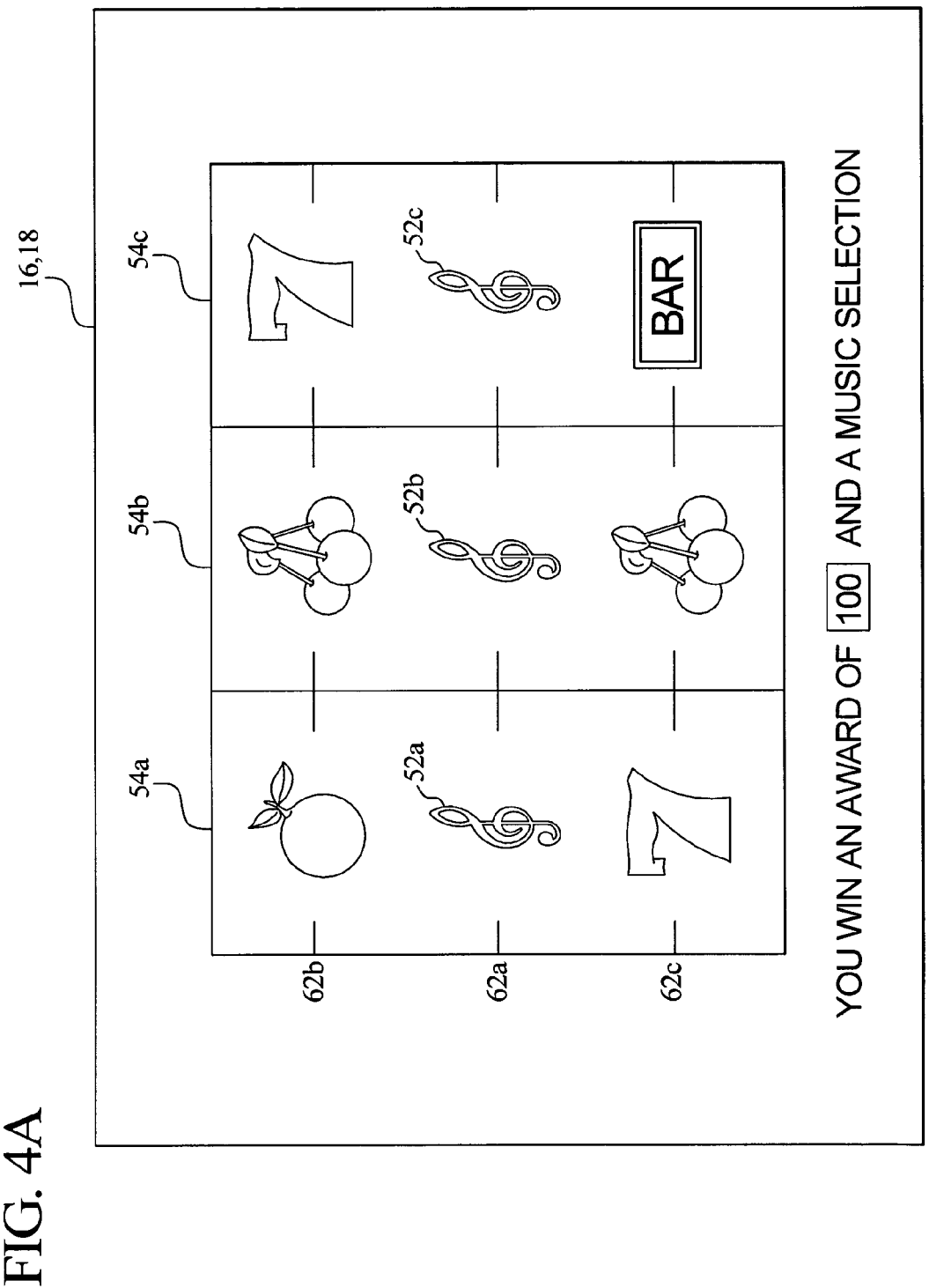
FIG. 4A is a front perspective view of one embodiment of the present invention illustrating an event in a game which triggers a musical selection by the player.

The gaming device, in one embodiment, presents a plurality of music selections to the player before the game or before different portions of the game. In an alternative embodiment, any suitable event before, during or after the base or bonus games can trigger the presentation of music selections to the player. In one embodiment of a reel game illustrated in FIG. 4A, the reels 54a, 54b and 54c include symbols 52 wherein the generation of a symbol or combination of symbols triggers the gaming device 10 to provide a plurality of musical selections to the player. FIG. 4A illustrates an example of a reel game which includes at least one music symbol 52a, 52b and 52c, such as a treble clef, on each reel. If the music symbols generated by the gaming device are indicated on the same payline 62A, the gaming device initiates a music selection mode of the game in which the gaming device presents a plurality of music selections.

Figure 4B:
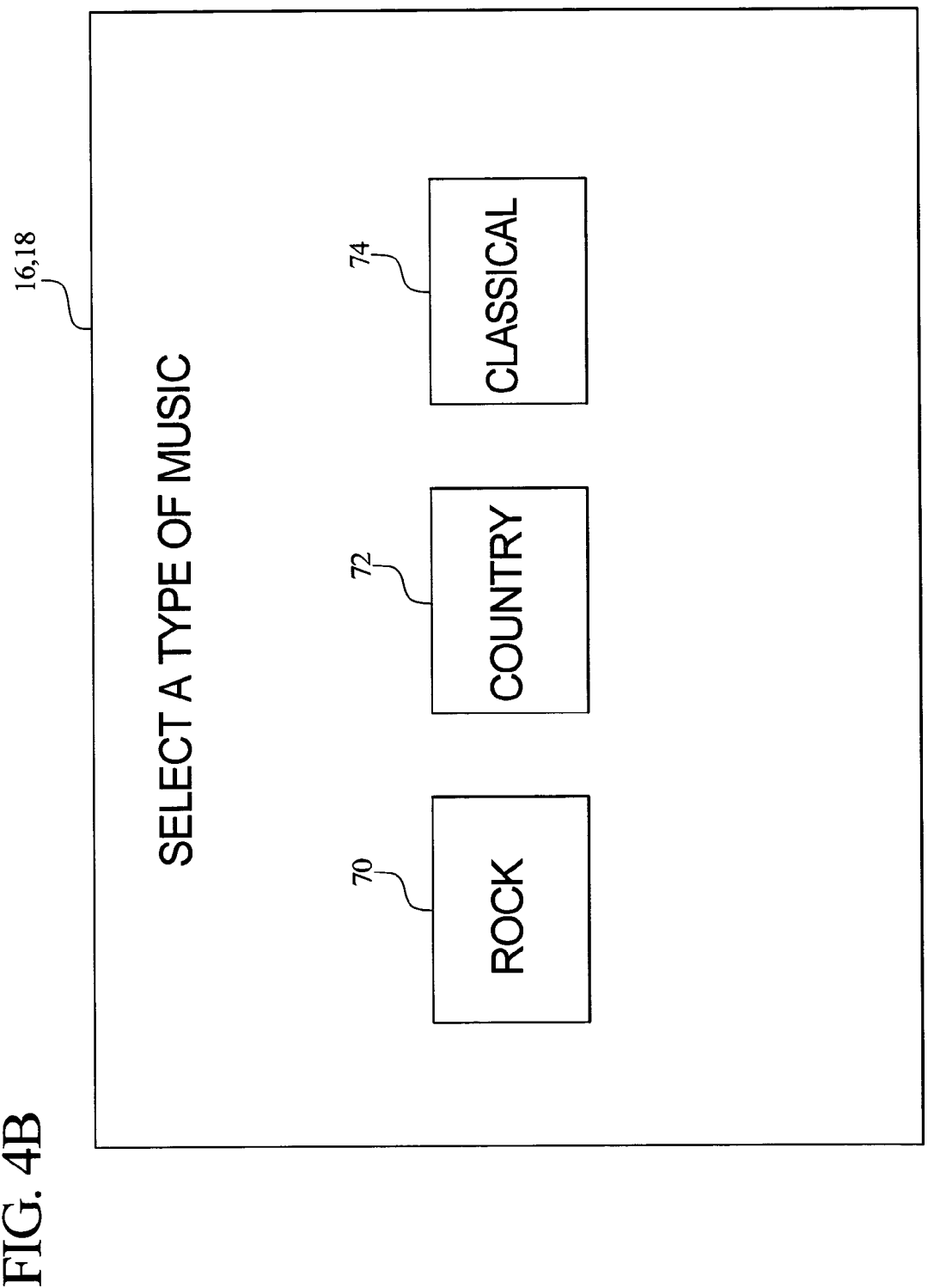
FIGS. 4B, 4C and 4D are front perspective views of one embodiment of the present invention illustrating examples of music classifications associated with the music selections displayed to the player.
Figure 4C:
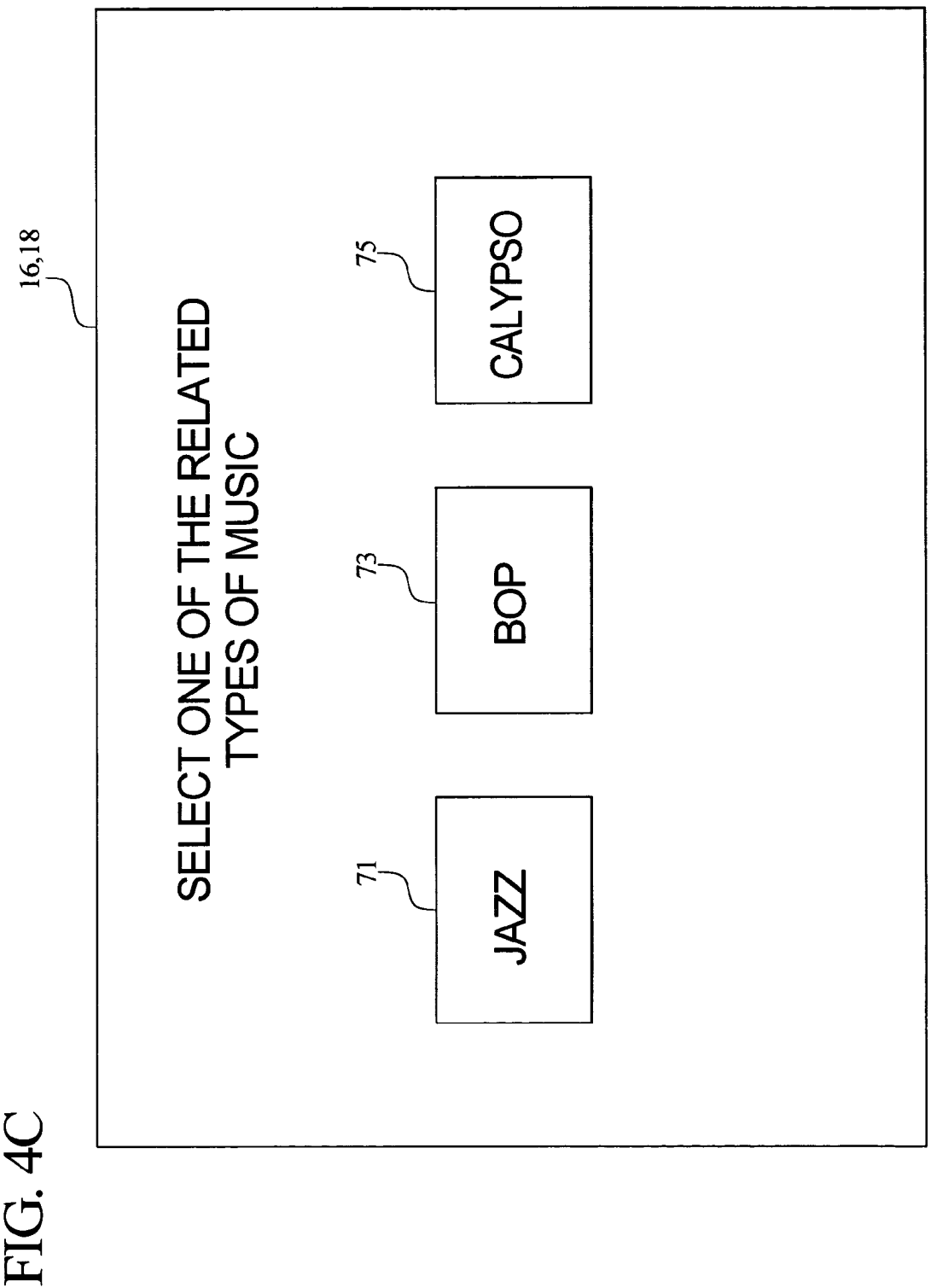
Figure 4D:
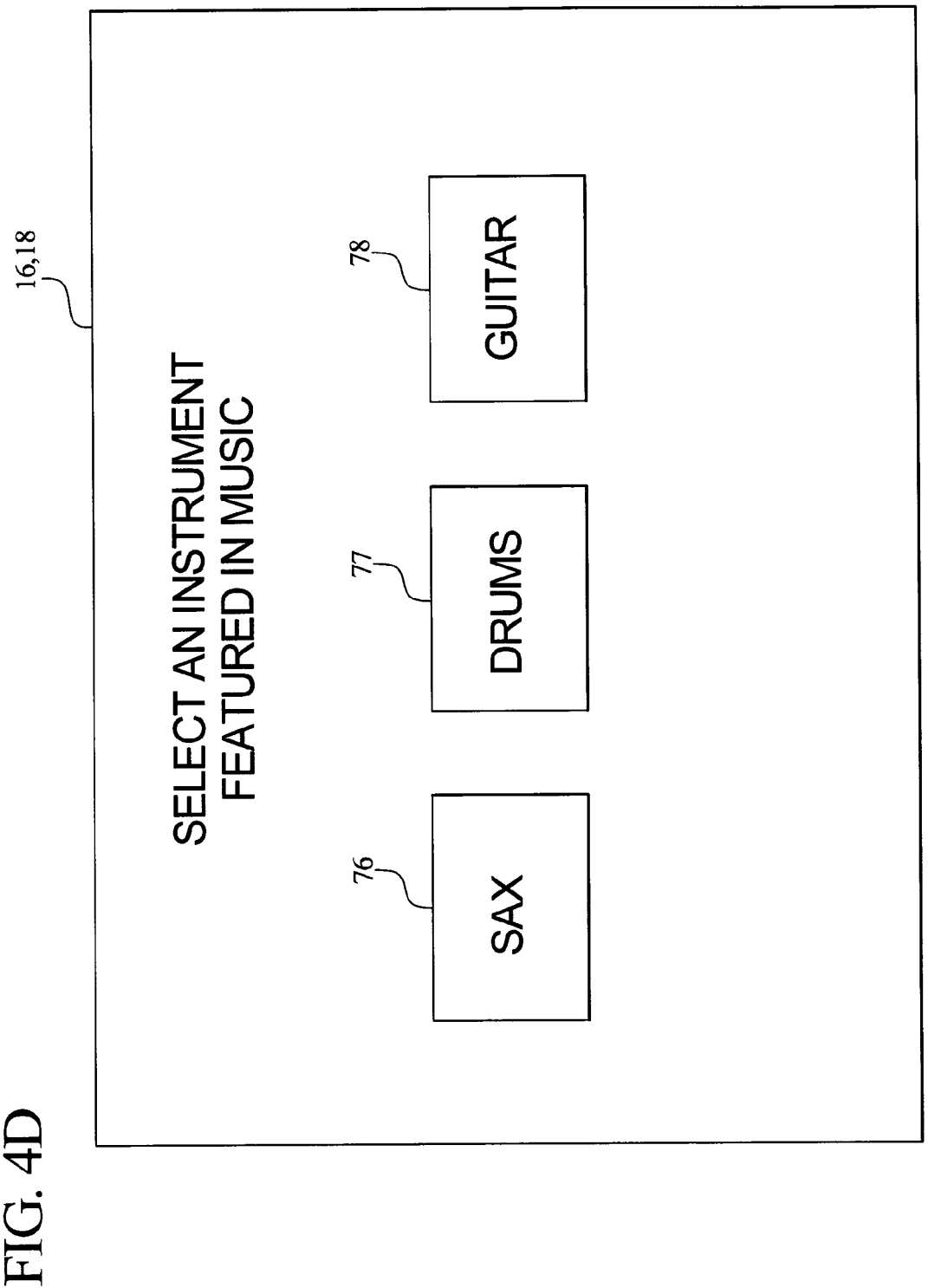

Referring now to FIGS. 4B, 4C and 4D, the gaming device, in one embodiment, associates with a plurality of selections, a plurality of music recordings classified or categorized according to classifications such as genre, style, period, artist or group, album, song, instrumentation or any other suitable category or classification of music. The gaming device displays or presents a plurality of selections including the associated music classifications to the player. As illustrated in FIG. 4B, a triggering event, such as the combination of symbols generated in the example of FIG. 4A, causes the gaming device to display a sampling of music genre associated with three different selections. The gaming device in FIG. 4B generates three different classifications of music within the same classification level, i.e. different music genre. In FIG. 4B, the genre of rock, country and classical music are associated with the three selections 70, 72 and 74 to be selected by the player. In FIG. 4C, the gaming device associates related types of music from different classification levels, i.e. genre and style (Bop is a style of the Jazz genre and Calypso is a style of the World music genre). In FIG. 4C, Jazz, Bop and Calypso are associated with the music selections 71, 73, and 75, and, in one embodiment, are generated by the gaming device because of their association with the theme of the game. Likewise, in FIG. 4D, the gaming device presents music selections representing different types of instrumentation featured in the music recordings associated with the music selections 76, 77, and 78 such as sax, drums and guitar, respectively.

In one embodiment, the gaming device enables the player to pick one of the presented selections and the gaming device selects and plays a suitable music recording or series of recordings within the music classification associated with the music selection picked by the player which are stored in the gaming machine or accessible by the gaming machine. The gaming device plays music recordings associated with the selected classification until the music and the game ends, or until another event interrupts the music performance such as another segment of the game.

Additionally, in one embodiment, the gaming device enables the player to continue to narrow the selection of music to more specific sub-categories or classifications upon presentation of a plurality of music selections with associated music classifications. In the examples illustrated in FIG. 5A, 5B, 5C and 5D, the player 68 picks the jazz music selection 80b. The player 68 then picks the "Narrow Selection" input 92 instead of picking the random play input 90, or, in one embodiment, the player picks the "Narrow Selection" input to override the gaming device 10 randomly selecting and playing any musical performance from the jazz genre of music.

In response to the input 92, the gaming device 10 presents a plurality of sub-classifications associated with another plurality of selections 82a to 82i displayed to the player. It should be appreciated that any sub-class or level of classification such as style, artist, album, song, instrumentation, period, etc., can be associated with the music selections displayed to the player. In the example illustrated in FIG. 5B, the player 68 selection of the jazz music selection 80b and the narrow selection input 92 causes the gaming device 10 to display a plurality of selections 82a to 82i including the sub-classifications of the jazz music classification picked by the player 68. The gaming device 10 instructs the player 68 to select one of the types or styles of jazz. In response, the player 68 picks the fusion type or style of jazz associated with one of the style selections 82e. In the example illustrated in FIG. 5B, the player indicates a further desire to narrow the music selections.

Figure 5A:
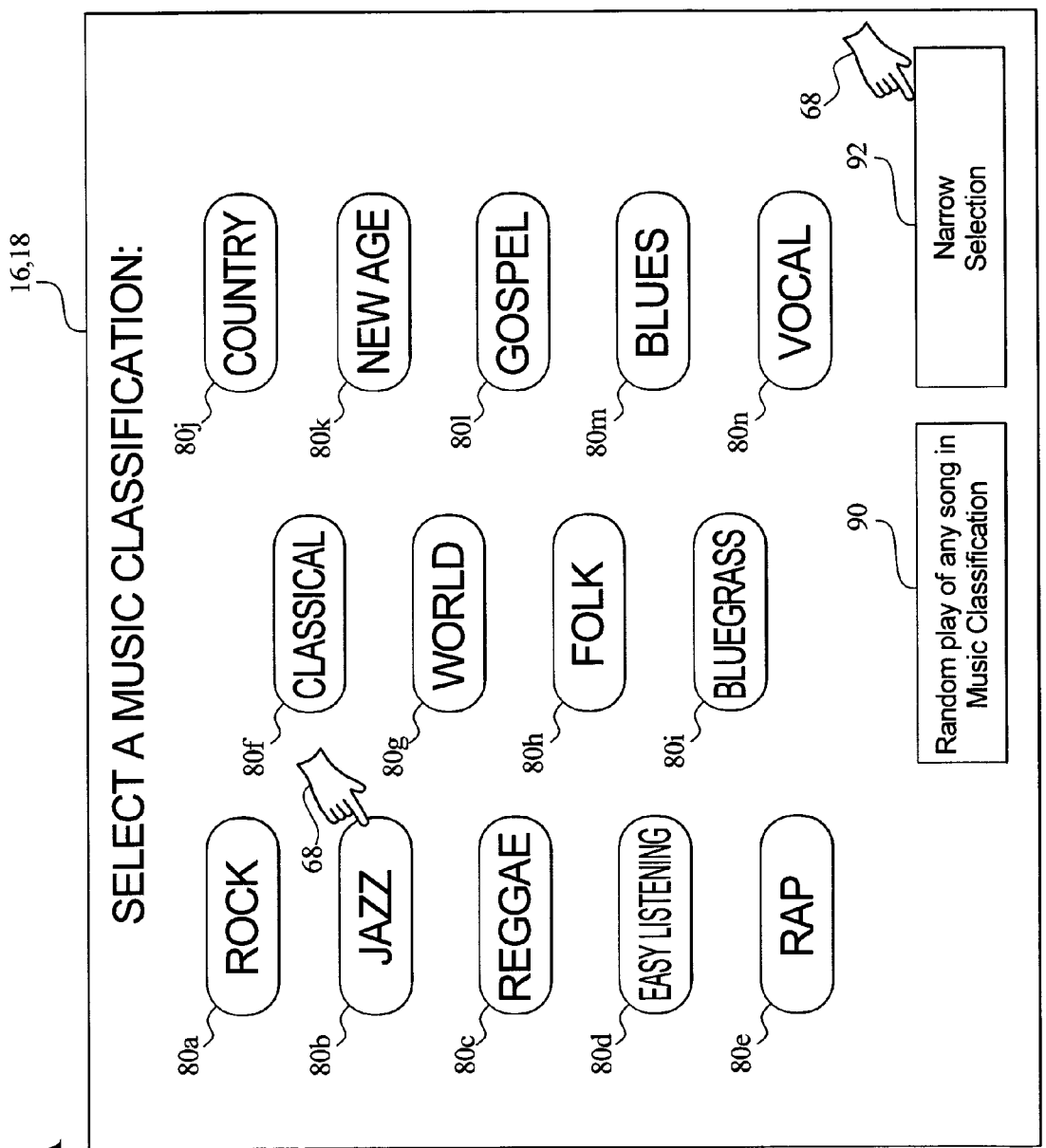
FIGS. 5A, 5B, 5C and 5D are front perspective views of one embodiment of the present invention illustrating the progression of selections made by a player from a general music classification to a specific music classification.
Figure 5B:
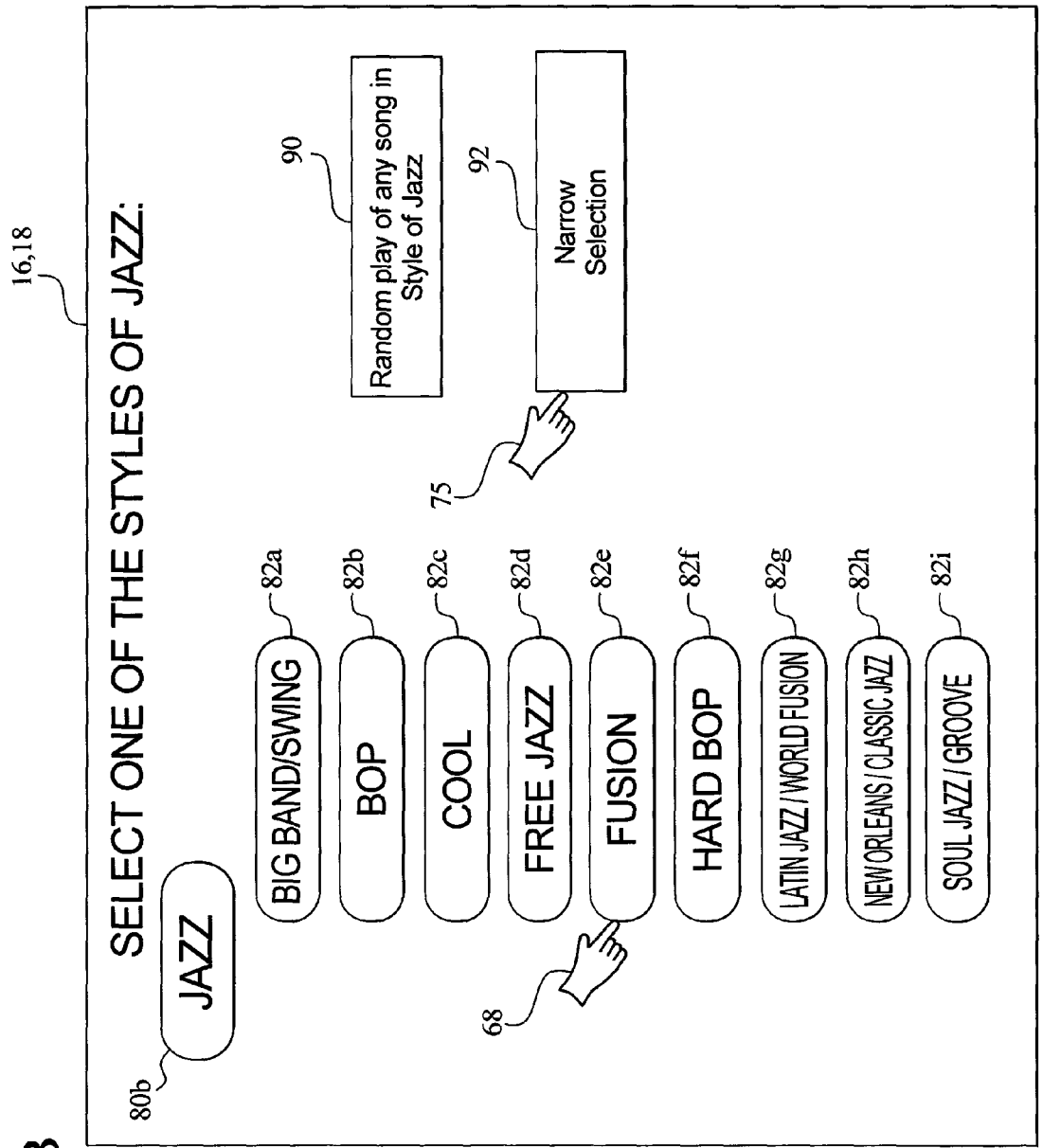
Figure 5C:
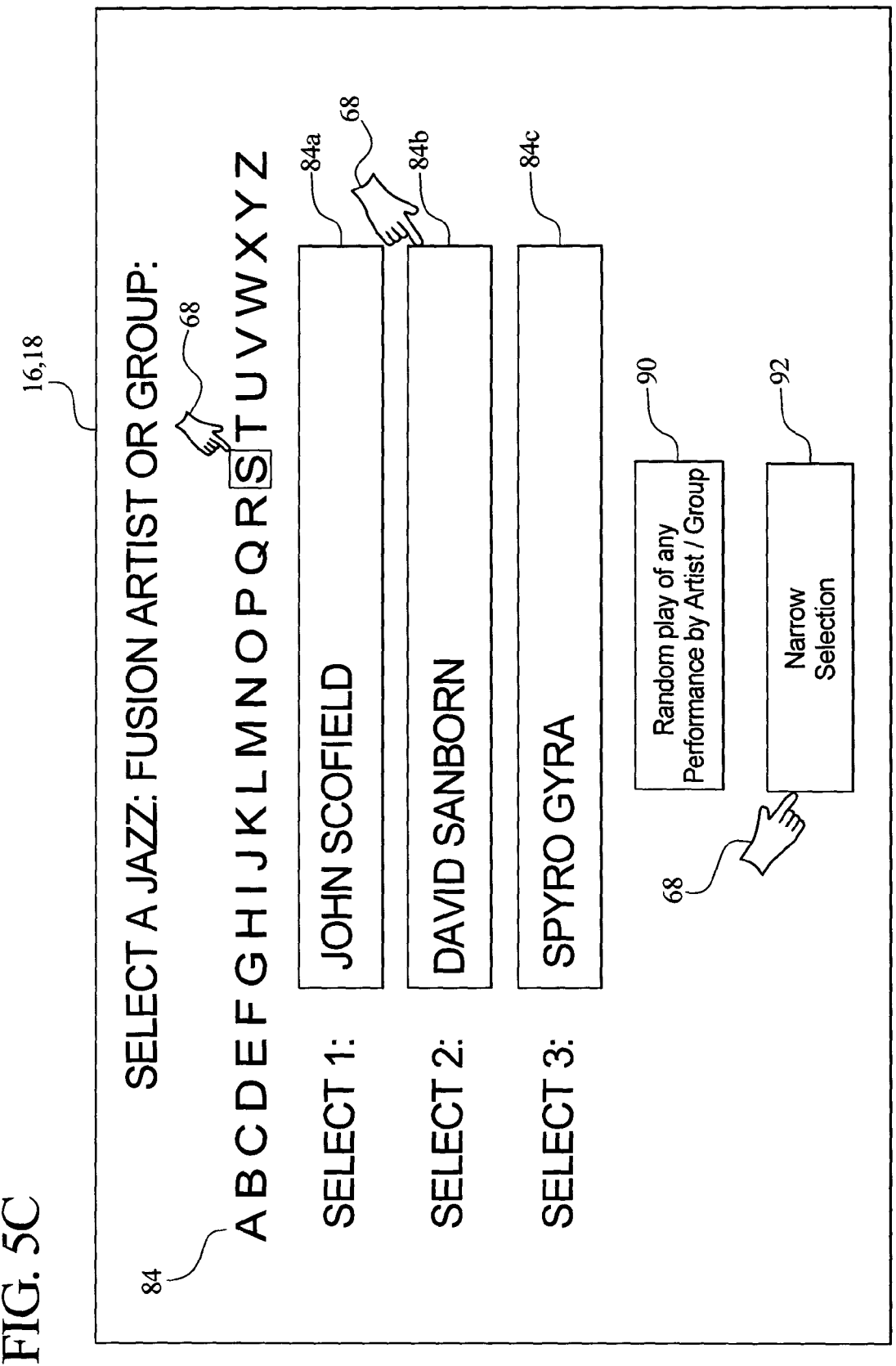

In FIG. 5C, the gaming device displays sub-classifications of the fusion style of the jazz genre of music. In the example illustrated in FIG. 5C, the gaming device associates artists or groups whose music is classified as fusion style of the jazz genre of music with the selections 84a, 84b and 84c. It should be appreciated that sub-categories or classifications can be grouped under multiple classifications. For example, David Sanborn and his music may be classified under the jazz styles of fusion and soul. In one embodiment, the gaming device uses player-selectable letters 84 representing more specific levels of music classification to ease navigation and searching for such levels. In FIG. 5C, the gaming device organizes the names of artists or groups of a music classification according to the first letter of the name of the group or last name of the artist. The player 68 picks the selection 84 associated with the letter "S," either randomly or by seeking a particular artist or group. Among the artists and groups listed under the letter "S", the player 68 picks the selection 84b which includes the music of David Sanborn. Again, in FIG. 5C, the player 68 chooses to proceed to a sub-category or sub-classification of music associated with David Sanborn by picking the "Narrow Selection" input 92.

Figure 5D:
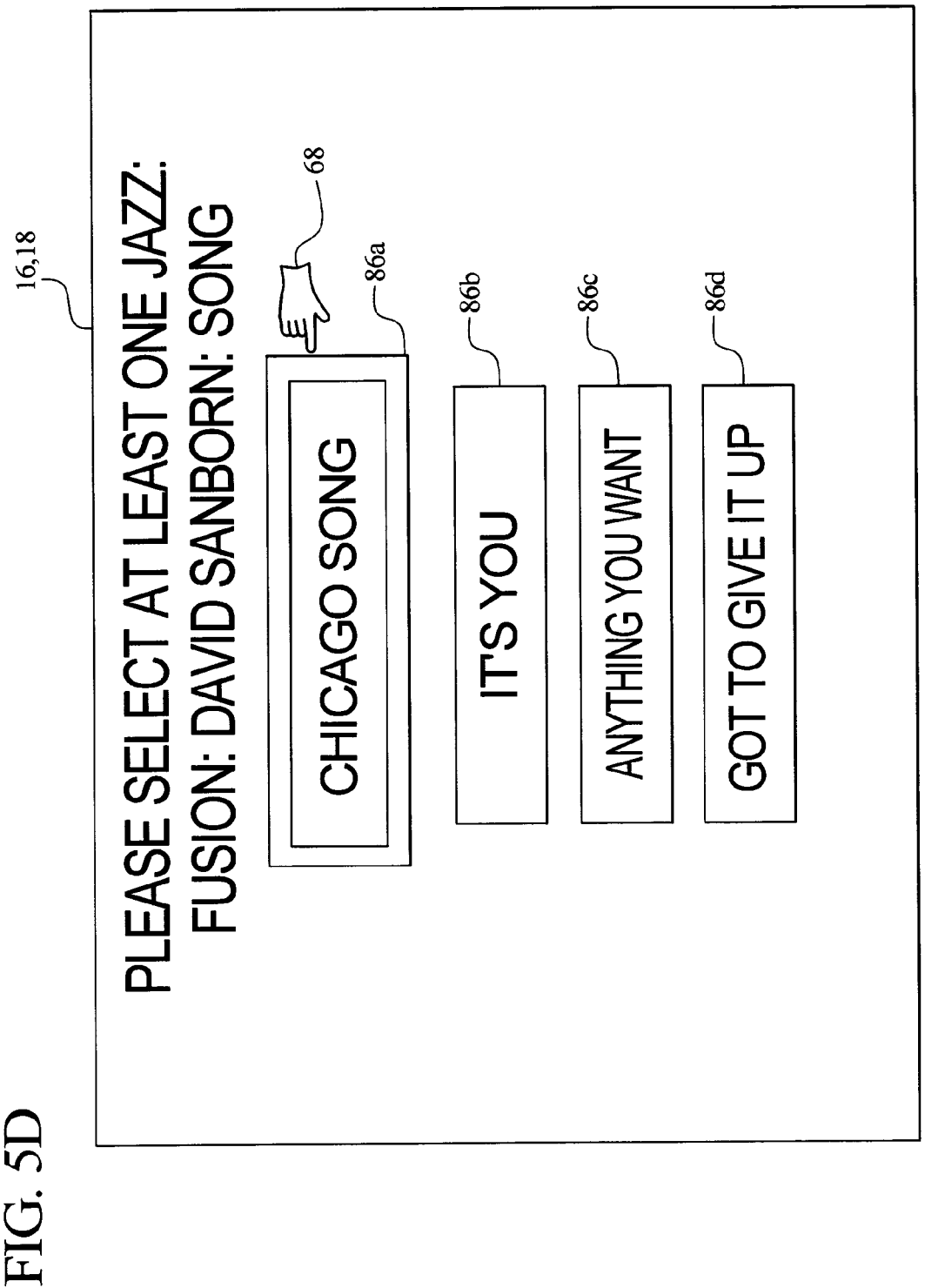

In FIG. 5D, the gaming device 10, in one embodiment, enables the player 68 to pick a plurality of songs by David Sanborn associated with the selections 86a to 86d displayed to the player 68. Alternatively, the gaming device associates a plurality of albums with the player-selectable selections before enabling the player to pick specific songs from those albums. It should be appreciated that the more narrow the selections made by the player, i.e. the fewer music recordings in the classification, the more frequently the gaming device will need to solicit input from the player for continuous music play. Once a music selection is picked by the player, the gaming device plays music recordings associated with the classification of music selected by the player.

Figure 6A:
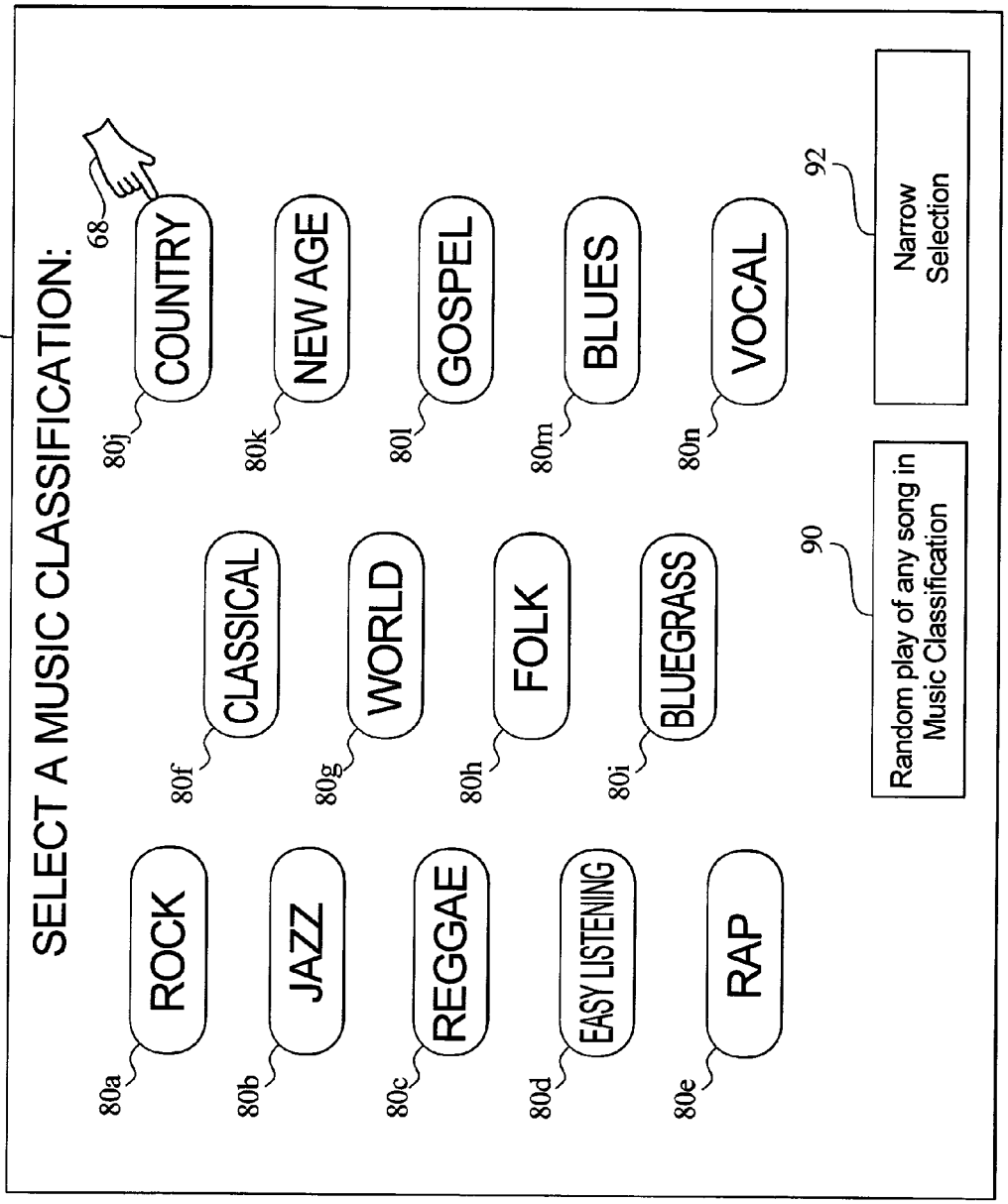
FIGS. 6A and 6B are front perspective views of one embodiment of the present invention illustrating the association of a theme of a game with a music selection.
Figure 6B:
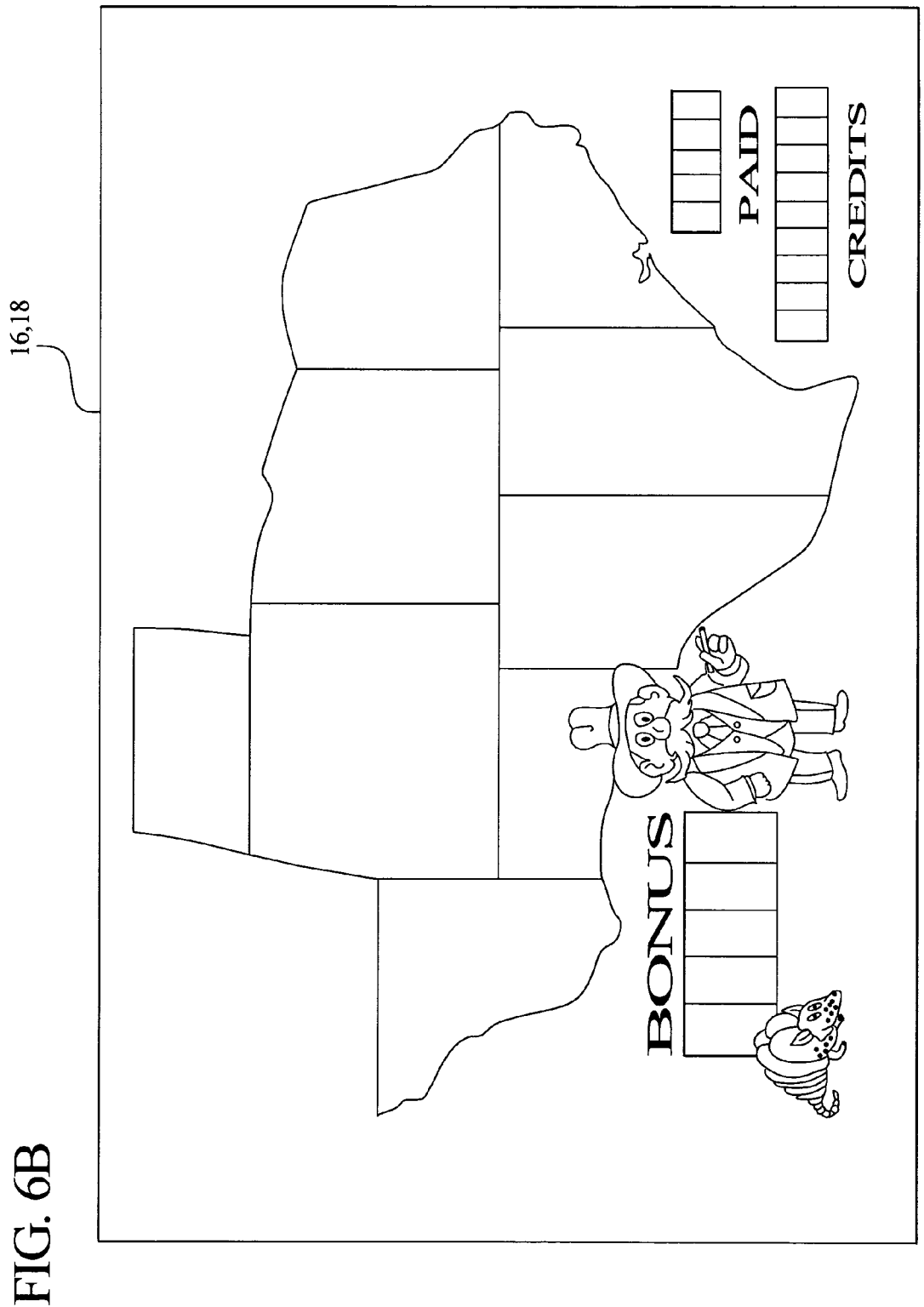

In FIGS. 6A and 6B, in one embodiment, the music classification is associated with at least one of the various themes of the game. Alternatively, the selected music classification determines the game to be played, preferably one with a theme associated with the style of music selected by the player. In the example of the embodiment illustrated in FIG. 6A, the player picks the country music genre. In response to the player picking the selection 80j associated with the country music genre, the gaming device 10 selects a bonus game predetermined to be associated with the genre selected by the player such as a base or bonus game with a western theme as illustrated in FIG. 6B. The western theme continues throughout the game or until a predetermined event occurs in the game such as winning an award, transitioning to a different level of the game, triggering a bonus game, or an input by the player as desired by the implementer.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the The invention is claimed as follows:

1. A gaming device comprising:
   at least one display device;
   at least one input device;
   at least one music producing device;
   at least one processor; and
   at least one memory device which stores:
   (i) data corresponding to:
      (a) a plurality of awards;
      (b) a plurality of symbols associated with a plurality of the awards, the plurality of symbols including at least one music selection symbol associated with a music selection condition;
      (c) a plurality of game themes, at least two of the game themes being different, each different game theme being associated with a different one of a plurality of different images;
      (d) at least two different classifications of music, each one of the classifications of music being associated with a different one of the game themes; and
      (e) a plurality of player selectable selections, each one of the player selectable selections being associated with one of the classifications of music; and
   (ii) a plurality of instructions, which when executed by the at least one processor, cause the at least one processor to operate with the at least one display device, the at least one input device and the at least one music producing device, for a play of a game to:
      (a) start the play of the game after receiving a wager from a player;
      (b) cause a display of a first one of the images for the play of the game, the first image being associated with a first one of the game themes;
      (c) randomly generate a plurality of the symbols in association with the play of the game;
      (d) provide at least one of the awards as a result of one or more of the randomly generated symbols corresponding to a winning outcome;
      (e) determine whether the music selection condition is satisfied for the play of the game, the determination being based, at least in part, on whether the randomly generated symbols include the at least one music selection symbol;
      (f) if the randomly generated symbols do not include the at least one music selection symbol for the play of the game:
         (i) cause the player-selectable selections of the classifications of music to be unavailable for picking by the player; and
         (ii) continue the operation of the play of the game involving the first image and the first game theme; and
      (g) if the randomly generated symbols include the at least one music selection symbol for the play of the game:
         (i) cause the player-selectable selections of the classifications of music to be available for picking by the player;
         (ii) determine a second one of the game themes in response to a pick of one of the player-selectable selections of the classification of music by the player;
         (iii) cause the music producing device to produce music having the classification of music picked by the player;
         (iv) cause a display of a second one of the images, the second image being associated with the determined second game theme; and
         (v) continue the operation of the play of the game involving the second image and the second game theme.

2. The gaming device of claim 1, wherein each of the different classifications of music is selected from the group consisting of: genre, style, period, instrumentation, artist, album and song.

3. The gaming device of claim 1, wherein the classifications of music include at least two of the following: rock, country, jazz, classical, new age, world, folk, bluegrass, rap, reggae, blues, vocal, gospel and easy listening.

4. The gaming device of claim 1, wherein the plurality of different classifications of music include sub-classifications of music, wherein said sub-classifications are associated with a plurality of player-selectable second selections.

5. The gaming device of claim 1, wherein at least one of the classifications of music is coordinated with said determined second game theme.

6. The gaming device of claim 1, wherein: (a) the at least one music selection symbol includes a symbol selected from the group consisting of a music symbol, a symbol related to music, and a symbol related to a musical characteristic; (b) the memory device stores data which corresponds to a plurality of reels; and (c) when executed by the at least one processor, the plurality of instructions cause the at least one processor to randomly generate the plurality of the symbols in association with the reels.

7. A gaming device comprising:
   at least one display device;
   at least one input device;
   at least one music producing device;
   at least one processor; and
   at least one memory device which stores:
   (i) data corresponding to:
      (a) a plurality of awards;
      (b) a plurality of symbols associated with a plurality of the awards, the plurality of symbols including at least one music selection symbol associated with a music selection condition;
      (c) a plurality of game themes, at least two of the game themes being different, each different game theme being associated with a different one of a plurality of different images;
      (d) a plurality of player-selectable selections;
      (e) at least two different classifications of music, each classification associated with one of the different selections, wherein each of the classifications is associated with one of the game themes; and
      (f) a plurality of music recordings, wherein each recording is associated with one of the classifications of music;
   (ii) a plurality of instructions, which when executed by the at least one processor, cause the at least one processor to operate with the at least one display device and the at least one input device, for a play of a game, to:
      (a) start the play of the game after receiving a wager from a player;
      (b) cause a display of a first one of the images, the first image being associated with a first one of the game themes;

(c) randomly generate a plurality of the symbols in association with the play of the game;
(d) provide at least one of the awards as a result of one or more of the randomly generated symbols corresponding to a winning outcome;
(e) determine whether the music selection condition is satisfied, the determination being based, at least in part, on whether the randomly generated symbols include the at least one music selection symbol;
(f) if the randomly generated symbols do not include the at least one music selection symbol:
 (i) cause the player-selectable selections of the classifications of music to be unavailable for picking by the player; and
 (ii) continue the operation of the play of the game involving the first image and the first game theme; and
(g) if the randomly generated symbols include the at least one music selection symbol:
 (i) cause the player-selectable selections of the classifications of music to be available for picking by the player;
 (ii) determine a second one of the game themes in response to a pick of one of the player-selectable selections of the classification of music by the player;
 (iii) cause music having the classification of music picked by the player to be played;
 (iv) cause a display of a second one of the images, the second image being associated with the determined second game theme; and
 (v) continue the operation of the play of the game involving the second image and the second game theme.

8. The gaming device of claim 7, wherein: (a) the at least one music selection symbol includes a symbol selected from the group consisting of a music symbol, a symbol related to music, and a symbol related to a musical characteristic; (b) the memory device stores data which corresponds to a plurality of reels; and (c) when executed by the at least one processor, the plurality of instructions cause the at least one processor to randomly generate the plurality of the symbols in association with the reels.

9. A method of operating a gaming device including a plurality of instructions, said method, for a play of a game, comprising:
(a) designating a plurality of different game themes, wherein the different game themes are associated with different images;
(b) causing at least one processor to execute the plurality of instructions to start the play of the game after receiving a wager from a player;
(c) causing at least one display device to display a first one of the images, the first image being associated with a first one of the game themes;
(d) causing the at least one processor to execute the plurality of instructions to:
 (i) randomly generate a plurality of symbols in association with the play of the game;
 (ii) determine whether to provide an award as a result of one or more of the randomly generated symbols corresponding to a winning outcome; and
 (iii) determine whether the randomly generated symbols include at least one music selection symbol, the at least one music selection symbol being associated with a music selection condition;
(e) if the randomly generated symbols do not include the at least one music selection symbol, causing the at least one processor to execute the plurality of instructions to:
 (i) cause a plurality of selections to be unavailable for selection by the player, the selections being associated with a different classification of music, each one of the classifications of music being associated with one of the game themes; and
 (ii) continue the operation of the play of the game involving the first image and the first game theme; and
(f) if the randomly generated symbols include the at least one music selection symbol:
 (i) causing the at least one display device to:
  (1) display a plurality of selections available for selection by the player, each of the selections being associated with a different classification of music, each one of the classifications of music being associated with one of the game themes; and
  (2) indicate an opportunity for a player to select one of the classifications by selecting one of the selections;
 (ii) causing the at least one processor to execute the plurality of instructions to:
  (1) determine a second one of the game themes in response to a selection of one of the selections of one of the classifications of music by the player; and
  (2) cause at least one music producing device to produce music having the classification of music selected by the player to be played;
 (iii) causing the at least one display device to display a second one of the images, the second image being associated with the determined second game theme; and
 (vi) causing the at least one processor to execute the plurality of instructions to continue the operation of the play of the game involving the second image and the second game theme.

10. The method of claim 9, wherein each of the different classifications of music is selected from the group consisting of: genre, style, period, instrumentation, artist, album and song.

11. The method of claim 9, wherein the music classifications are selected from the group consisting of: rock, country, jazz, new age, world, folk, bluegrass, rap, reggae, blues, vocal, gospel or easy listening.

12. The method of claim 9, wherein (a) to (f) are provided through a data network.

13. The method of claim 12, wherein the data network is an internet.

14. The method of claim 9, wherein the at least one music selection symbol includes generating at least one symbol selected from the group consisting of a music symbol, a symbol related to music, and a symbol related to a musical characteristic.

15. A method of operating a gaming device, said method, for a play of a game, comprising:
(a) specifying a plurality of different game themes, wherein the different game themes are associated with different images;
(b) associating a plurality of different music recordings with a plurality of different player-selectable selections;
(c) associating each one of the music recordings with one of the game themes;
(d) causing at least one processor to execute the plurality of instructions to start the play of the game after receiving a wager from a player;

(e) causing at least one display device to display a first one of the images, the first image being associated with a first one of the game themes;
(f) causing the at least one processor to execute the plurality of instructions to:
  (i) randomly generate a plurality of symbols in association with the play of the game;
  (ii) determine whether to provide an award as a result of one or more of the randomly generated symbols corresponding to a winning outcome; and
  (iii) determine whether the randomly generated symbols include at least one music selection symbol, the at least one music selection symbol being associated with a music selection condition;
(g) if the randomly generated symbols do not include the at least one music selection symbol, causing the at least one processor to execute the plurality of instructions to:
  (i) cause player-selectable selections and the associated music recordings to be unavailable for picking by the player; and
  (ii) continue the operation of the play of the game involving the first image and the first game theme; and
(h) if the randomly generated symbols include the at least one music selection symbol:
  (i) causing the at least one display device to:
    (1) display the plurality of different player-selectable selections available for picking by the player; and
    (2) indicate an opportunity for a player to pick one of the displayed selections and the associated one of the music recordings;
  (ii) causing the at least one processor to execute the plurality of instructions to determine a second one of the game themes in response to a pick of one of the displayed selections and the associated one of the music recordings by the player-;
  (iii) causing the at least one display device to display a second one of the images, the second image being associated with the determined second game theme;
  (iv) causing at least one music performing device to perform at least the music recording associated with the displayed selection picked by the player; and
  (v) causing the at least one processor to execute the plurality of instructions to continue the operation of the play of the game involving the second image and the second game theme.

16. The method of claim 15, wherein (a) to (h) are provided through a data network.

17. The method of claim 16, wherein the data network is an internet.

18. The method of claim 15, wherein the at least one music selection symbol includes at least one symbol selected from the group consisting of a music symbol, a symbol related to music, and a symbol related to a musical characteristic.

19. A method of operating a gaming device, said method, for a play of a game, comprising:
(a) causing at least one processor to execute the plurality of instructions to start the play of the game after receiving a wager from a player;
(b) causing at least one display device to display a first image, the first image being associated with a first game theme;
(c) causing the at least one processor to execute the plurality of instructions to:
  (i) randomly generate a plurality of symbols in association with the play of the game;
  (ii) determine whether to provide an award as a result of one or more of the randomly generated symbols corresponding to a winning outcome; and
  (iii) determine whether the randomly generated symbols include at least one music selection symbol;
(d) if the randomly generated symbols do not include the at least one music selection symbol, causing the at least one processor to execute the plurality of instructions to:
  (i) cause a plurality of selections to be unavailable for picking by the player, wherein for each of the selections, a different classification of music is associated with said selection, the classifications of music being associated with a plurality of different game themes, the different game themes being associated with different images; and
  (ii) continue the operation of the play of the game involving the first image and the first game theme; and
(e) if the randomly generated symbols include the at least one music selection symbol,
  (i) causing the at least one display device to:
    (1) display a plurality of selections available for picking by the player;
    (2) indicate a different classification of music associated with each of the selections, the classifications of music being associated with a plurality of different game themes, the different game themes being associated with different images; and
    (3) indicate an opportunity for a player to pick one of the classifications by picking one of the selections;
  (ii) causing the at least one processor to execute the plurality of instructions to determine a second one of the game themes in response to a pick of one of the selections by the player, the determined second game theme being associated with the classification of music associated with the selection picked by the player;
  (iii) causing at least one music producing device to produce music having the classification of music associated with the selection picked by the player;
  (iv) causing the at least one display device to display a second one of the images, the second image being associated with the determined second game theme; and
  (v) causing the at least one processor to execute the plurality of instructions to continue the operation of the play of the game involving the second image, the second game theme and the selected classification of music.

20. The method of claim 19, wherein (a) to (e) are provided through a data network.

21. The method of claim 20, wherein the data network is an internet.

22. The method of claim 19, wherein the at least one music selection symbol includes a symbol selected from the group consisting of a music symbol, a symbol related to music, and a symbol related to a musical characteristic.

23. A gaming system comprising:
at least one display device;
at least one input device;
at least one output device;
at least one memory device which stores a plurality of instructions which are executable to provide access to data, the data corresponding to:
  (a) a game which is operable upon a wager by a player;
  (b) a plurality of symbols including at least one music selection symbol associated with a music selection condition;

(c) a plurality of different sound recordings which are producible during a play of the game;
(d) a plurality of different game themes; and
(e) a plurality of different images associated with the different game themes; and at least one processor operatively coupled to the at least one display device, the at least one input device, the at least one output device and the at least one memory device, the at least one processor configured to execute the instructions, for the play of the game, to:
(a) start the play of the game after receiving the wager from the player;
(b) cause a display of a first one of the images, the first image being associated with a first one of the game themes;
(c) randomly generate a plurality of the symbols in association with the play of the game;
(d) determine whether to provide an award as a result of one or more of the randomly generated symbols corresponding to a winning outcome;
(e) determine whether the music selection condition is satisfied, the determination being based, at least in part, on whether the randomly generated symbols include the at least one music selection symbol;
(f) if the randomly generated symbols do not include the at least one music selection symbol:
  (i) causing a plurality of selections to be unavailable for picking by the player, each of the selections being associated with a different one of the sound recordings; and
  (ii) continue the operation of the play of the game involving the first image and the first game theme; and
(g) if the randomly generated symbols include the at least one music selection symbol:
  (i) causing a plurality of selections to be available for picking by the player, each of the selections being associated with a different one of the sound recordings;
  (ii) determine a second one of the game themes in response to a pick of one of the selections and the associated sound recording by the player;
  (iii) cause the at least one output device to produce a sound based on the sound recording associated with the selection picked by the player;
  (iv) cause a display of a second one of the images, the second image being associated with the determined second game theme; and
  (v) continue the operation of the play of the game involving the second image, the second game theme and the produced sound.

24. The gaming system of claim 23, wherein each one of the different sound recordings corresponds to a classification of music selected from the group consisting of: genre, style, period, instrumentation, artist, album and song.

25. The gaming system of claim 24, wherein each one of the classifications of music includes at least two of the following: rock, country, jazz, classical, new age, world, folk, bluegrass, rap, reggae, blues, vocal, gospel and easy listening.

26. The gaming system of claim 24, wherein the plurality of classifications of music include sub-classifications of music, wherein said sub-classifications are associated with a plurality of player-selectable second selections.

27. The gaming system of claim 23, wherein a first plurality of the different game themes corresponds to a first play of the game, and a second plurality of the different game themes corresponds to a second play of the game.

28. The gaming system of claim 23, wherein: (a) the at least one music selection symbol includes a symbol selected from the group consisting of a music symbol, a symbol related to music, and a symbol related to a musical characteristic; (b) the at least one memory device stores data which corresponds to a plurality of reels; and (c) which when executed by the at least one processor, the plurality of instructions cause the at least one processor to randomly generate the plurality of the symbols in association with the reels.

29. A gaming system comprising:
at least one display device;
at least one input device;
at least one output device;
at least one memory device which stores a plurality of instructions which are executable to provide access to data, the data corresponding to:
(a) a game which is operable upon a wager by a player;
(b) a plurality of symbols including at least one music selection symbol associated with a music selection condition;
(c) a plurality of different classifications of music;
(d) a plurality of different game themes; and
(e) a plurality of different images associated with the different game themes; and at least one processor operatively coupled to the at least one display device, the at least one input device, the at least one output device and the at least one memory device, the at least one processor configured to execute the instructions, for a play of the game, to:
(a) start the play of the game after receiving the wager from the player;
(b) cause a display of a first one of the images, the first image being associated with a first one of the game themes;
(c) randomly generate a plurality of the symbols in association with the play of the game;
(d) determine whether to provide an award as a result of one or more of the randomly generated symbols corresponding to a winning outcome;
(e) determine whether the music selection condition is satisfied, the determination being based, at least in part, on whether the randomly generated symbols include the at least one music selection symbol;
(f) if the randomly generated symbols do not include the at least one music selection symbol:
  (i) cause a plurality of selections to be unavailable for picking by the player, each of the selections being associated with a different one of the classifications of music; and
  (ii) continue the operation of the play of the game involving the first image and the first game theme; and
(g) if the randomly generated symbols include the at least one music selection symbol:
  (i) cause a plurality of selections to be available for picking by the player, each of the selections being associated with a different one of the classifications of music;
  (ii) determine a second one of the game themes in response to a pick of one of the selections and the associated classification of music by the player;
  (iii) cause the at least one output device to produce music classification of music associated with the picked selection; and
  (iv) cause a display of a second one of the images, the second image being associated with the determined second game theme; and (v) continue the operation of the play of the game involving the second image, the second game theme and the produced music.

30. The gaming system of claim 29, wherein each one of the different classifications of music is selected from the group consisting of: genre, style, period, instrumentation, artist, album and song.

31. The gaming system of claim 29, wherein each one of the classifications of music includes at least two of the following: rock, country, jazz, classical, new age, world, folk, bluegrass, rap, reggae, blues, vocal, gospel and easy listening.

32. The gaming system of claim 29, wherein the plurality of classifications of music include sub-classifications of music, wherein said sub-classifications are associated with a plurality of player-selectable second selections.

33. The gaming system of claim 29, wherein a first plurality of the different game themes corresponds to a first play of the game, and a second plurality of the different game themes corresponds to a second play of the game.

34. A gaming system comprising:
at least one display device;
at least one input device;
at least one output device;
at least one memory device which stores a plurality of instructions which are executable to provide access to data, the data corresponding to:
(a) a game which is operable upon a wager by a player;
(b) a plurality of symbols including at least one music selection symbol associated with a music selection condition;
(c) a plurality of different classifications of music;
(d) a plurality of different game display interfaces; and
(e) a plurality of different images associated with the different game display interfaces; and
at least one processor operatively coupled to the at least one display device, the at least one input device, the at least one output device and the at least one memory device, the at least one processor configured to execute the instructions, for a play of the game, to:
(a) start the play of the game after receiving the wager from the player;
(b) cause a display of an initial one of the images, the initial image being associated with an initial one of the game display interfaces;
(c) randomly generate a plurality of the symbols in association with the play of the game;
(d) determine whether to provide an award as a result of one or more of the randomly generated symbols corresponding to a winning outcome;
(e) determine whether the music selection condition is satisfied, the determination being based, at least in part, on whether the randomly generated symbols include the at least one music selection symbol;
(f) if the randomly generated symbols do not include the at least one music selection symbol:
(i) cause the classifications of music to be unavailable for selection by the player; and
(ii) continue the operation of the play of the game involving the initial image and the initial game display interface; and
(g) if the randomly generated symbols include the at least one music selection symbol:
(i) cause the classifications of music to be available for selection by the player;
(ii) indicate an opportunity for a player to select one of the classifications of music;
(iii) in response to a selection of a first one of the classifications of music by the player:
(x) determine a first selected music corresponding to the selected first classification of music,
(y) display a first one of the images, the first image being associated with a first one of the game display interfaces, the first game display interface associated with the selected first classification of music, and
(z) continue the operation of the play of the game involving the first image, the first game display interface and the first selected music; and
(iv) in response to a selection of a second one of the classifications of music by the player:
(x) determine a second selected music corresponding to the selected second classification of music,
(y) display a second one of the images, the second image being associated with a second one of the game display interfaces, the second game display interface being associated with the selected second classification of music, and
(z) continue the operation of the play of the game involving the second image, the second game display interface and the second selected music.

35. The gaming system of claim 34, wherein each one of the different classifications of music is selected from the group consisting of: genre, style, period, instrumentation, artist, album and song.

36. The gaming system of claim 34, wherein each one of the classifications of music includes at least two of the following: rock, country, jazz, classical, new age, world, folk, bluegrass, rap, reggae, blues, vocal, gospel and easy listening.

37. The gaming system of claim 34, wherein the plurality of classifications of music include sub-classifications of music, wherein said sub-classifications are associated with a plurality of player-selectable second selections.

38. The gaming system of claim 34, wherein a first plurality of the different game themes corresponds to a first play of the game, and a second plurality of the different game themes corresponds to a second play of the game.

* * * * *

UNITED STATES PATENT AND TRADEMARK OFFICE
CERTIFICATE OF CORRECTION

| | | |
|---|---|---|
| PATENT NO. | : 7,789,748 B2 | Page 1 of 1 |
| APPLICATION NO. | : 10/655416 | |
| DATED | : September 7, 2010 | |
| INVENTOR(S) | : Landrum et al. | |

It is certified that error appears in the above-identified patent and that said Letters Patent is hereby corrected as shown below:

IN THE CLAIMS:

In Claim 7, Column 18, Line 58, replace ""music;" with --music; and--.

In Claim 15, Column 21, Line 36, replace "player-;" with --player;--.

In Claim 29, Column 24, Line 64, delete "and".

Signed and Sealed this

Seventh Day of December, 2010

David J. Kappos
*Director of the United States Patent and Trademark Office*